US009578303B2

(12) United States Patent
Tsukagoshi et al.

(10) Patent No.: US 9,578,303 B2
(45) Date of Patent: Feb. 21, 2017

(54) IMAGE PROCESSING SYSTEM, IMAGE PROCESSING APPARATUS, AND IMAGE PROCESSING METHOD FOR DISPLAYING A SCALE ON A STEREOSCOPIC DISPLAY DEVICE

(75) Inventors: Shinsuke Tsukagoshi, Nasushiobara (JP); Hiroyasu Inokawa, Utsunomiya (JP); Michito Nakayama, Utsunomiya (JP)

(73) Assignee: Toshiba Medical Systems Corporation, Otawara-shi (JP)

( * ) Notice: Subject to any disclaimer, the term of this patent is extended or adjusted under 35 U.S.C. 154(b) by 111 days.

(21) Appl. No.: 13/495,295

(22) Filed: Jun. 13, 2012

(65) Prior Publication Data

US 2012/0313933 A1 Dec. 13, 2012

(30) Foreign Application Priority Data

Jun. 13, 2011 (JP) ................................. 2011-131518

(51) Int. Cl.
*G06T 19/00* (2011.01)
*H04N 13/00* (2006.01)

(52) U.S. Cl.
CPC ............. *H04N 13/007* (2013.01); *G06T 19/00* (2013.01); *G06T 2219/004* (2013.01); *G06T 2219/2016* (2013.01)

(58) Field of Classification Search
None
See application file for complete search history.

(56) References Cited

U.S. PATENT DOCUMENTS

2006/0197783 A1* 9/2006 Redert .................... G06T 15/10
345/664
2008/0144773 A1* 6/2008 Bar-Zohar ......... A61B 1/00096
378/98.12
(Continued)

FOREIGN PATENT DOCUMENTS

BE WO 2010095081 A1 * 8/2010 ......... H04N 13/0011
JP 3-78606 A 4/1991
(Continued)

OTHER PUBLICATIONS

Office Action issued on Jan. 13, 2015 in Japanese Patent Application No. 2011-131518.
(Continued)

*Primary Examiner* — Barry Drennan
*Assistant Examiner* — Diana Hickey
(74) *Attorney, Agent, or Firm* — Oblon, McClelland, Maier & Neustadt, L.L.P.

(57) ABSTRACT

According to one embodiment, an image processing system includes an acquisition unit, a determination unit, and an output unit. The acquisition unit acquires a rendering condition used for generating a parallax image group from volume data. The determination unit sets corresponding information for causing a space coordinate of a stereoscopic image viewed stereoscopically by referring to a stereoscopic display device that displays the parallax image group to correspond to a space coordinate of a captured site in the volume data based on the rendering condition and a display size and determines a scale for converting a length in a space of the stereoscopic image into a length in a space of the captured site based on the corresponding information. The output unit performs output control such that the scale is displayed.

10 Claims, 19 Drawing Sheets

(56) References Cited

U.S. PATENT DOCUMENTS

| 2011/0021936 A1* | 1/2011 | Luo ........................ A61B 5/044 |
| | | 600/523 |
| 2011/0107270 A1* | 5/2011 | Wang et al. .................. 715/850 |

FOREIGN PATENT DOCUMENTS

| JP | 6-113334 A | 4/1994 | | |
| JP | 9-74573 A | 3/1997 | | |
| JP | 10-170227 A | 6/1998 | | |
| JP | 2003-209858 A | 7/2003 | | |
| JP | 2005-86414 | 3/2005 | | |
| JP | 2005-136726 A | 5/2005 | | |
| JP | 2006-101329 A | 4/2006 | | |
| JP | 2007-172393 A | 7/2007 | | |
| WO | WO2010095081 | * | 8/2010 | ............. H04N 13/00 |

OTHER PUBLICATIONS

Office Action issued Sep. 15, 2015 in Japanese Patent Application No. 2011-131518.

* cited by examiner

IMAGE PROCESSING SYSTEM, IMAGE PROCESSING APPARATUS, AND IMAGE PROCESSING METHOD FOR DISPLAYING A SCALE ON A STEREOSCOPIC DISPLAY DEVICE

CROSS-REFERENCE TO RELATED APPLICATION(S)

This application is based upon and claims the benefit of priority from Japanese Patent Application No. 2011-131518, filed on Jun. 13, 2011; the entire contents of which are incorporated herein by reference.

FIELD

Embodiments described herein relate generally to an image processing system, an image processing apparatus, and an image processing method.

BACKGROUND

Conventionally, monitors enabling an observer to view two-parallax images captured from two points of view stereoscopically by using a specific device, such as a pair of stereoscopic vision glasses, have been in practical use. Furthermore, in recent years, monitors enabling an observer to view multi-parallax images (e.g., nine-parallax images) captured from a plurality of points of view stereoscopically with the naked eyes by using a beam control element, such as a lenticular lens, have also been in practical use. Such two-parallax images and nine-parallax images displayed on monitors enabling stereoscopic vision may be generated by estimating depth information of an image captured from one viewpoint and performing image processing using the information thus estimated.

For use in medical image diagnosis apparatuses, such as X-ray computed tomography (CT) apparatuses, magnetic resonance imaging (MRI) apparatuses, and ultrasound diagnosis apparatuses, apparatuses capable of generating three-dimensional medical image data (hereinafter, referred to as volume data) have been in practical use. Conventionally, volume data generated by such a medical image diagnosis apparatus is converted into a two-dimensional image by various types of image processing, and is displayed two-dimensionally on a general-purpose monitor. For example, volume data generated by such a medical image diagnosis apparatus is displayed two-dimensionally on a general-purpose monitor as a two-dimensional image (e.g., an axial image) obtained by cutting the volume data along a predetermined section (e.g., an axial plane) by rendering processing.

Furthermore, there has been developed a conventional technology for displaying a scale (a gauge) in the X-Y direction for causing a two-dimensional image to correspond to a real space of a captured site in volume data together with the two-dimensional image.

DETAILED DESCRIPTION

Figure 1:
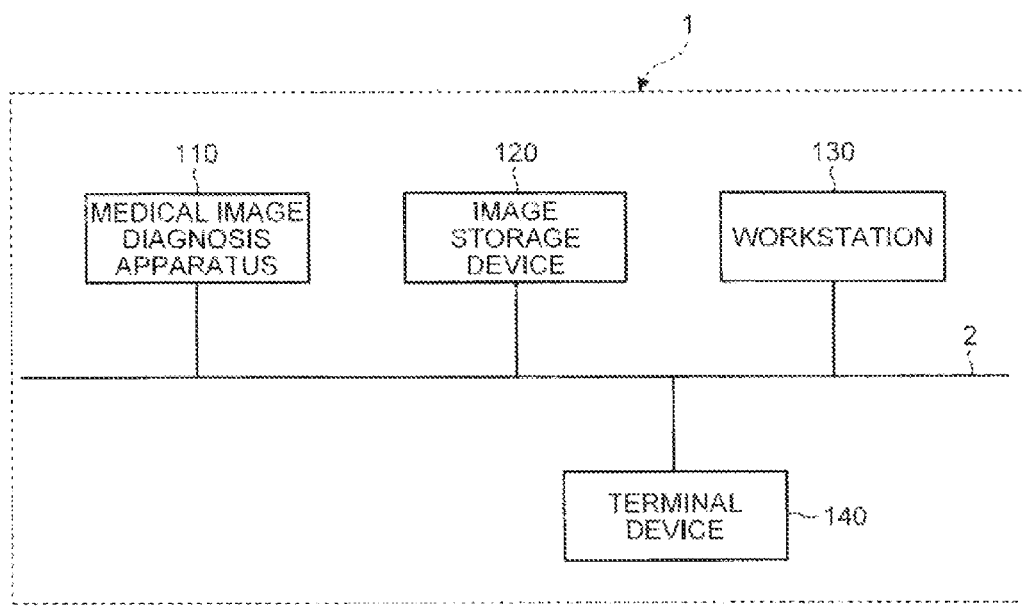
FIG. 1 is a diagram for explaining an exemplary configuration of an image processing system according to a first embodiment.

According to one embodiment, an image processing system includes an acquisition unit, a determination unit, and an output unit. The acquisition unit is configured to acquire a rendering condition used for generating a parallax image group that is a predetermined parallax number of parallax images from volume data that is three-dimensional medical image data. The determination unit is configured to set corresponding information for causing a space coordinate of a stereoscopic image viewed stereoscopically by referring to a stereoscopic display device that displays the parallax image group to correspond to a space coordinate of a captured site in the volume data based on at least a parallactic angle between parallax images constituting the parallax image group included in the rendering condition and a display size of the parallax image group displayed on the stereoscopic display device (132, 142), and to determine a scale for converting a length in a perpendicular direction with respect to a display surface of the stereoscopic display device in a space of the stereoscopic image into a length in a space of the captured site based on the corresponding information. The output unit is configured to perform output control such that the scale is displayed on the stereoscopic display device in a manner superimposed on the stereoscopic image based on the parallax image group.

Exemplary embodiments of an image processing system and an image processing apparatus are described below in greater detail with reference to the accompanying drawings. In the description below, an image processing system including a workstation having a function as an image processing apparatus will be explained as the embodiments. Terms used in the embodiments below will now be described. A "parallax image group" represents an image group generated by moving a viewpoint position with respect to volume data by a predetermined parallactic angle to perform volume rendering processing. In other words, the "parallax image group" is composed of a plurality of "parallax images" whose "viewpoint positions" are different from one another. A "parallactic angle" represents an angle defined by viewpoint positions adjacent to each other among viewpoint positions set for generating the "parallax image group" and a predetermined position in a space indicated by the volume data (e.g., the center of the space). A "parallax number" represents the number of "parallax images" required for achieving stereoscopic vision on a stereoscopic display monitor. In the description below, "nine-parallax images" represent a "parallax image group" composed of nine "parallax images". Furthermore, in the description below, "two-parallax images" represent a "parallax image group" composed of two "parallax images". A "stereoscopic image" represents an image viewed stereoscopically by an observer on a stereoscopic display monitor. In other words, the stereoscopic display monitor displays a parallax number of parallax images, thereby displaying the "stereoscopic image" to the observer. A "stereoscopic image space" represents a virtual space sensed by the observer who refers to the "stereoscopic image" on the stereoscopic display monitor. A "real space" represents an actual space of a captured site in volume data.

First Embodiment

An exemplary configuration of an image processing system according to a first embodiment will now be described. FIG. 1 is a diagram for explaining the exemplary configuration of the image processing system according to the first embodiment.

As illustrated in FIG. 1, an image processing system 1 according to the first embodiment includes a medical image diagnosis apparatus 110, an image storage device 120, a workstation 130, and a terminal device 140. The devices exemplified in FIG. 1 can communicate with one another directly or indirectly via an in-hospital local area network (LAN) 2 established in a hospital, for example. If a picture archiving and communication system (PACS) is introduced into the image processing system 1, for example, the devices transmit and receive a medical image and the like among one another in accordance with the digital imaging and communications in medicine (DICOM) standard.

The image processing system 1 generates a parallax image group from volume data, which is three-dimensional medical image data generated by the medical image diagnosis apparatus 110, and displays the parallax image group on a monitor enabling stereoscopic vision, thereby providing a medical image capable of being viewed stereoscopically to a doctor or a laboratory technician who works for the hospital. Specifically, in the first embodiment, the workstation 130 performs various types of image processing on the volume data to generate the parallax image group. The workstation 130 and the terminal device 140 have a monitor enabling stereoscopic vision, and display the parallax image group generated by the workstation 130 on the monitor. The image storage device 120 stores therein the volume data generated by the medical image diagnosis apparatus 110 and the parallax image group generated by the workstation 130. In other words, the workstation 130 and the terminal device 140 acquire the volume data and the parallax image group from the image storage device 120 to process the volume image and to display the parallax image group on the monitor. The devices will be explained below in order.

The medical image diagnosis apparatus 110 may be an X-ray diagnosis apparatus, an X-ray CT apparatus, an MRI apparatus, an ultrasound diagnosis apparatus, a single photon emission computed tomography (SPECT) apparatus, a positron emission computed tomography (PET) apparatus, an SPECT-CT apparatus in which an SPECT apparatus and an X-ray CT apparatus are integrated, a PET-CT apparatus in which a PET apparatus and an X-ray CT apparatus are integrated, or a group of these apparatuses. The medical image diagnosis apparatus 110 according to the first embodiment can generate three-dimensional medical image data (volume data).

Specifically, the medical image diagnosis apparatus 110 according to the first embodiment captures a subject to generate volume data. The medical image diagnosis apparatus 110, for example, captures a subject to acquire data, such as projection data and an MR signal, and reconstructs medical image data of a plurality of axial planes in a body axis direction of the subject from the data thus acquired, thereby generating volume data. The medical image diagnosis apparatus 110 reconstructs medical image data of 500 axial planes, for example. The medical image data group of 500 axial planes is volume data. Alternatively, the projection data and the MR signal of the subject captured by the medical image diagnosis apparatus 110 may be used as volume data, for example.

The medical image diagnosis apparatus 110 according to the first embodiment transmits the volume data thus generated to the image storage device 120. When transmitting the volume data to the image storage device 120, the medical image diagnosis apparatus 110 transmits a patient ID for identifying a subject, an examination ID for identifying an examination, an apparatus ID for identifying the medical image diagnosis apparatus 110, and a series ID for identifying single capturing performed by the medical image diagnosis apparatus 110, for example, as additional information.

The image storage device 120 is a database that stores therein medical images. Specifically, the image storage device 120 according to the first embodiment stores the volume data transmitted from the medical image diagnosis apparatus 110 in a storage unit to store the volume data therein. Furthermore, the image storage device 120 according to the first embodiment can store a parallax image group generated from volume data by the workstation 130 in the storage unit to store the parallax image group therein. In this case, the workstation 130 transmits the parallax image group thus generated to the image storage device 120, and the image storage device 120 stores the parallax image group transmitted from the workstation 130 in the storage unit to store the parallax image group therein. In the present embodiment, the workstation 130 and the image storage device 120 exemplified in FIG. 1 may be integrated by using the workstation 130 that can store large-volume images therein. In other words, in the present embodiment, the workstation 130 itself may store therein the volume data or the parallax image group.

In the first embodiment, the volume data and the parallax image group stored in the image storage device 120 are stored therein in a manner corresponding to the patient ID, the examination ID, the apparatus ID, the series ID, and the like. Therefore, the workstation 130 and the terminal device 140 acquire required volume data and a required parallax image group from the image storage device 120 by performing a search using the patient ID, the examination ID, the apparatus ID, the series ID, and the like.

The workstation 130 is an image processing apparatus that performs image processing on a medical image. Specifically, the workstation 130 according to the first embodiment performs various types of rendering processing on volume data acquired from the image storage device 120 to generate a parallax image group. The parallax image group is a plurality of parallax images captured from a plurality of points of view. For example, a parallax image group displayed on a monitor enabling an observer to view nine-parallax images stereoscopically with the naked eyes is nine parallax images whose viewpoint positions are different from one another.

The workstation 130 according to the first embodiment includes a monitor enabling stereoscopic vision (hereinafter, referred to as a stereoscopic display monitor) as a display unit. The workstation 130 generates a parallax image group, and displays the parallax image group thus generated on the stereoscopic display monitor. As a result, an operator of the workstation 130 can perform an operation for generating the parallax image group while checking a medical image that is displayed on the stereoscopic display monitor and capable of being viewed stereoscopically.

The workstation 130 transmits the parallax image group thus generated to the image storage device 120. When transmitting the parallax image group to the image storage device 120, the workstation 130 transmits the patient ID, the examination ID, the apparatus ID, and the series ID, for example, as additional information. Examples of the additional information transmitted when the workstation 130 transmits the parallax image group to the image storage device 120 include additional information related to the parallax image group. Examples of the additional information related to the parallax image group includes the number of parallax images (e.g., "nine"), resolution of the parallax image (e.g., "466 pixels×350 pixels"), and the like. Furthermore, the workstation 130 can transmit the parallax image group thus generated to the terminal device 140 in response to a request for stereoscopic vision from the terminal device 140.

The terminal device 140 is a device by which a doctor or a laboratory technician who works for the hospital browses a medical image. The terminal device 140 may be a personal computer (PC), a tablet PC, a personal digital assistant (PDA), or a mobile phone operated by the doctor or the laboratory technician who works for the hospital, for example. Specifically, the terminal device 140 according to the first embodiment includes a stereoscopic display monitor as a display unit. The terminal device 140 acquires a parallax image group from the workstation 130 or the image storage device 120, and displays the parallax image group thus acquired on the stereoscopic display monitor. As a result, the doctor or the laboratory technician who is the observer can browse the medical image capable of being viewed stereoscopically.

The stereoscopic display monitor included in the workstation 130 and the terminal device 140 will now be described. A typical general-purpose monitor in the most widespread use nowadays displays a two-dimensional image two-dimensionally, and fails to display the two-dimensional image stereoscopically. If the observer desires stereoscopic vision on the general-purpose monitor, a device that outputs images to the general-purpose monitor needs to display two-parallax images capable of being viewed stereoscopically by the observer with a parallel method and an intersection method in parallel. Alternatively, the device that outputs images to the general-purpose monitor needs to display an image capable of being viewed stereoscopically by the observer by a complementary color method using a pair of glasses in which red cellophane is attached to a portion for the left eye and blue cellophane is attached to a portion for the right eye, for example.

By contrast, there has been developed a stereoscopic display monitor enabling the observer to view two-parallax images (also referred to as binocular parallax images) stereoscopically by using a specific device, such as a pair of stereoscopic vision glasses.

Figure 2A:
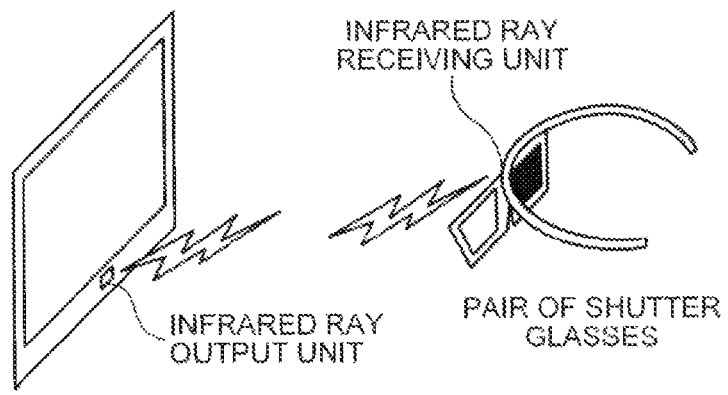
FIG. 2A and FIG. 2B are schematics for explaining an example of a stereoscopic display monitor that performs stereoscopic display using two-parallax images.
Figure 2B:
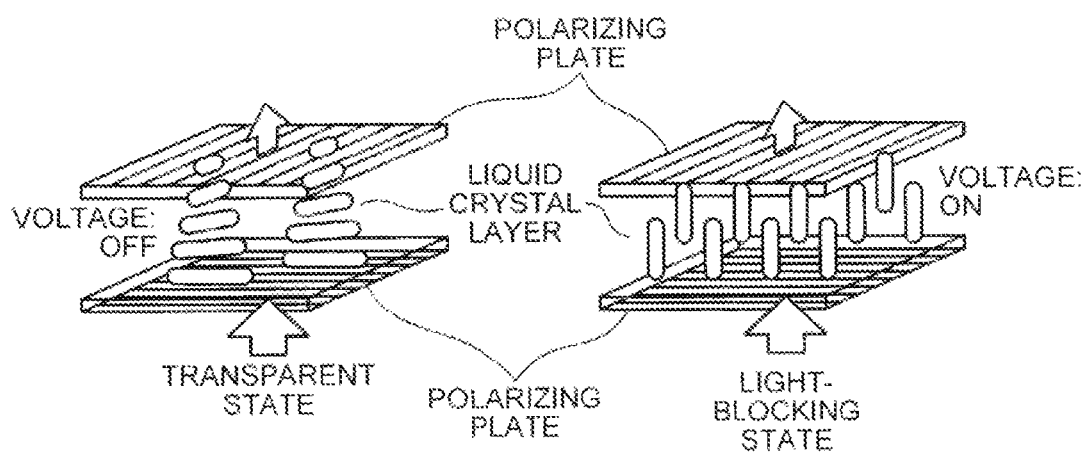

FIG. 2A and FIG. 2B are schematics for explaining an example of a stereoscopic display monitor that performs stereoscopic display using two-parallax images. The example illustrated in FIG. 2A and FIG. 2B is a stereoscopic display monitor that performs stereoscopic display by a shutter method, and a pair of shutter glasses is used as the pair of stereoscopic vision glasses worn by the observer who observes the monitor. The stereoscopic display monitor outputs the two-parallax images alternately on the monitor. The monitor illustrated in FIG. 2A, for example, outputs an image for the left eye and an image for the right eye alternately at 120 Hz. As illustrated in FIG. 2A, the monitor is provided with an infrared ray output unit. The infrared ray output unit controls output of infrared rays in synchronization with an operational timing at which the images are switched.

The infrared rays output from the infrared ray output unit are received by an infrared ray receiving unit of the pair of shutter glasses illustrated in FIG. 2A. A shutter is attached to a left frame and a right frame of the pair of shutter glasses. The pair of shutter glasses switches the state of the left shutter and the right shutter between a transparent state and a light-blocking state alternately in synchronization with an operational timing at which the infrared ray receiving unit receives the infrared rays. The switching processing for the shutter between the transparent state and the light-blocking state will now be described.

As illustrated in FIG. 2B, each of the shutters includes an incident-side polarizing plate, an output-side polarizing plate, and a liquid crystal layer between the incident-side polarizing plate and the output-side polarizing plate. As illustrated in FIG. 2B, the incident-side polarizing plate and the output-side polarizing plate are arranged in a manner orthogonal to each other. As illustrated in FIG. 2B, in an "OFF" state where no voltage is applied, light passing through the incident-side polarizing plate is caused to rotate 90 degrees by an action of the liquid crystal layer and pass through the output-side polarizing plate. In other words, a shutter to which no voltage is applied is in the transparent state.

By contrast, as illustrated in FIG. 2B, in an "ON" state where a voltage is applied, a polarization rotation effect caused by liquid crystal molecules of the liquid crystal layer vanishes, whereby light passing through the incident-side polarizing plate is blocked by the output-side polarizing plate. In other words, a shutter to which a voltage is applied is in the light-blocking state.

Therefore, the infrared ray output unit outputs infrared rays while the image for the left eye is being displayed on the monitor, for example. The infrared ray receiving unit applies no voltage to the left-eye shutter, and applies a voltage to the right-eye shutter while receiving the infrared rays. Thus, as illustrated in FIG. 2A, the right-eye shutter is in the light-blocking state, and the left-eye shutter is in the transparent state, whereby the image for the left eye is incident on the left eye of the observer. By contrast, the infrared ray output unit stops output of the infrared rays while the image for the right eye is being displayed on the monitor. The infrared ray receiving unit applies no voltage to the right-eye shutter, and applies a voltage to the left-eye shutter while receiving no infrared ray. Thus, the left-eye shutter is in the light-blocking state, and the right-eye shutter is in the transparent state, whereby the image for the right eye is incident on the right eye of the observer. As described above, the stereoscopic display monitor illustrated in FIG. 2A and FIG. 2B switches the images displayed on the monitor in synchronization with the states of the shutters, thereby displaying an image capable of being viewed stereoscopically by the observer. In terms of a stereoscopic display monitor enabling the observer to view two-parallax images stereoscopically, a monitor employing a polarizing glasses method is also known in addition to the monitor employing the shutter method described above.

Furthermore, examples of a stereoscopic display monitor that has been put to practical use in recent years include a monitor enabling an observer to view multi-parallax images, such as nine-parallax images, stereoscopically with the naked eyes by using a beam control element, such as a lenticular lens. Such a stereoscopic display monitor enables stereoscopic vision by binocular parallax and stereoscopic vision by motion parallax in which video to be observed changes in association with movement of the viewpoint of the observer.

Figure 3:
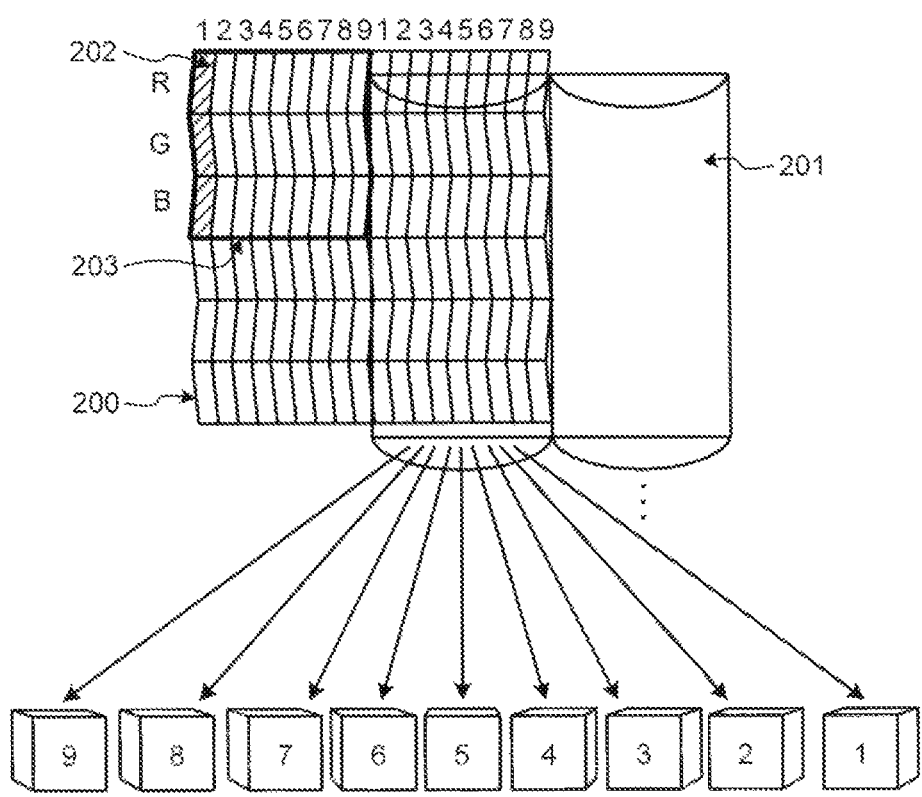
FIG. 3 is a schematic for explaining an example of a stereoscopic display monitor that performs stereoscopic display using nine-parallax images.

FIG. 3 is a schematic for explaining an example of a stereoscopic display monitor that performs stereoscopic display using nine-parallax images. In the stereoscopic display monitor illustrated in FIG. 3, a beam control element is arranged in front of a display surface 200 in a planar shape, such as a liquid crystal panel. In the stereoscopic display monitor illustrated in FIG. 3, for example, a vertical lenticular sheet 201 whose optical aperture extends in the vertical direction is attached to the front of the display surface 200 as the beam control element. In the example illustrated in FIG. 3, the vertical lenticular sheet 201 is attached such that a convex portion thereof faces the front. Alternatively, the vertical lenticular sheet 201 may be attached such that the convex portion thereof faces the display surface 200.

As illustrated in FIG. 3, pixels 202 whose aspect ratio is 3 to 1 and in which three sub pixels of red (R), green (G), and blue (B) are aligned in the longitudinal direction are arranged in a matrix manner. The stereoscopic display monitor illustrated in FIG. 3 converts nine-parallax images composed of nine images into an intermediate image in which the nine-parallax images are arranged in a predetermined format (e.g., a grid pattern), and outputs the intermediate image to the display surface 200. The nine-parallax images, for example, are converted into an intermediate image in a format of a grid pattern in which the nine images are arranged in "three rows and three columns", and are output to the display surface 200. In other words, the stereoscopic display monitor illustrated in FIG. 3 allocates nine pixels in the same position in the nine-parallax images to the pixels 202 of nine columns, and outputs the nine pixels. The pixels 202 of nine columns are a unit pixel group 203 that displays nine images whose viewpoint positions are different from one another simultaneously.

The nine-parallax images output simultaneously as the unit pixel group 203 on the display surface 200 are emitted as parallel light by a light emitting diode (LED) backlight, for example, and are emitted in multi-directions by the vertical lenticular sheet 201. Light of each pixel in the nine-parallax images is emitted in multi-directions, whereby light incident on the right eye and the left eye of the observer changes in association with the position of the observer (position of the viewpoint). In other words, the parallax image incident on the right eye and the parallax image incident on the left eye have different parallactic angles depending on the viewing angle of the observer. As a result, the observer can view a captured subject stereoscopically at each of the nine positions illustrated in FIG. 3, for example. Furthermore, the observer can view the captured subject stereoscopically in a manner facing the captured subject at the position of "5" illustrated in FIG. 3, and can view the captured subject stereoscopically such that the position of the captured subject is changed at each of the positions other than "5" illustrated in FIG. 3, for example. The stereoscopic display monitor illustrated in FIG. 3 is just an example. The stereoscopic display monitor that displays nine-parallax images may be a horizontal stripe liquid crystal of "RRR . . . , GGG . . . , BBB . . . " as illustrated in FIG. 3, or may be a vertical stripe liquid crystal of "RGBRGB . . . ". The stereoscopic display monitor illustrated in FIG. 3 may employ a vertical lens method in which the lenticular sheet is arranged vertically as illustrated in FIG. 3, or may employ an oblique lens method in which the lenticular sheet is arranged obliquely. The format of the intermediate image is not limited to the grid pattern of "three rows and three columns". The format of the intermediate image may be an arbitrary format in accordance with the specifications of the monitor, such as "one row and nine columns" or "nine rows and one column", for example.

The stereoscopic display monitor explained with respect to FIG. 2A and FIG. 2B is hereinafter referred to as a two-parallax monitor. The stereoscopic display monitor explained with respect to FIG. 3 is hereinafter referred to as a nine-parallax monitor. In other words, the two-parallax monitor is a stereoscopic display device that enables stereoscopic vision by binocular parallax. The nine-parallax monitor is a stereoscopic display device that enables stereoscopic vision by binocular parallax and that can change the image observed by the observer depending on "movement of the viewpoint of the observer (motion parallax)" by displaying nine images (nine-parallax images) simultaneously.

The explanation has been made of the exemplary configuration of the image processing system 1 according to the first embodiment. Application of the image processing system 1 is not limited to the case where the PACS is introduced. The image processing system 1 is also applied to the case where an electronic chart system for managing electronic charts to which medical images are attached is introduced, for example. In this case, the image storage device 120 corresponds to a database that stores therein the electronic charts. Furthermore, the image processing system 1 is also applied to the case where a hospital information system (HIS) or a radiology information system (RIS) is introduced, for example. The configuration of the image processing system 1 is not limited to the exemplary configuration described above. Functions of each device and assignation thereof may be changed as appropriate depending on aspects of operations.

Figure 4:
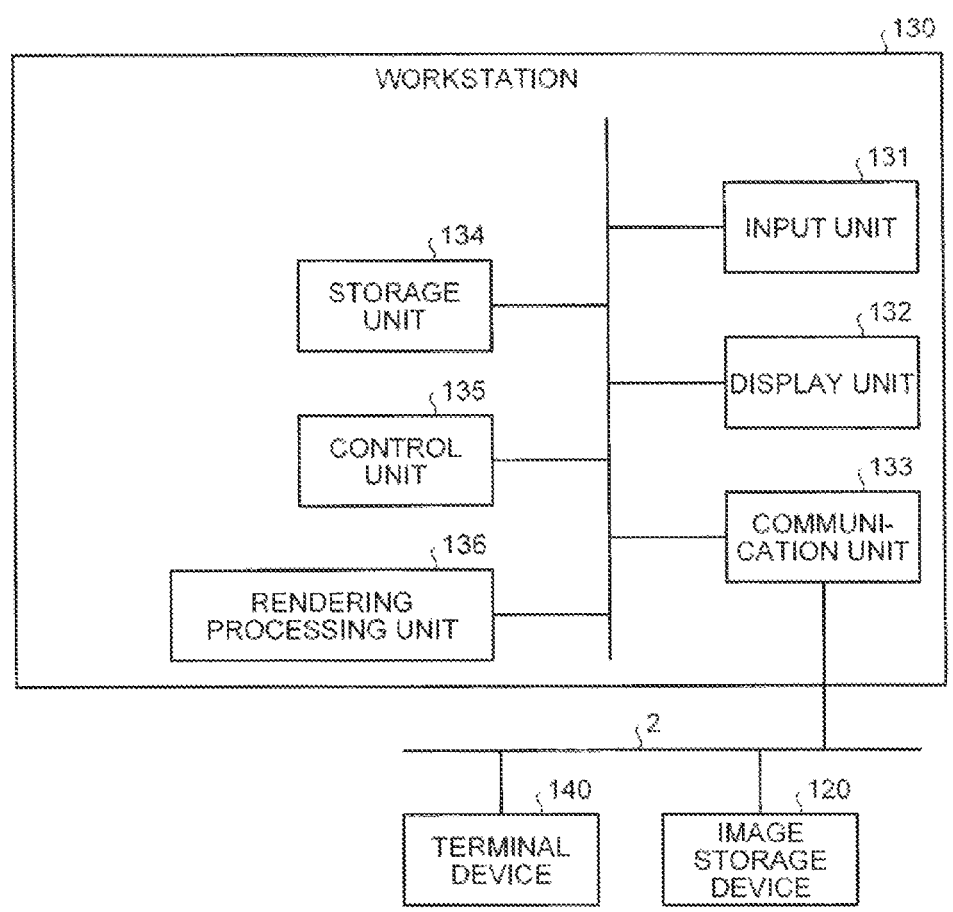
FIG. 4 is a diagram for explaining an exemplary configuration of a workstation according to the first embodiment.

An exemplary configuration of the workstation according to the first embodiment will now be described with reference to FIG. 4. FIG. 4 is a diagram for explaining the exemplary configuration of the workstation according to the first embodiment. In the description below, a "parallax image group" represents an image group for stereoscopic vision (a volume rendering image group) generated by performing volume rendering processing on volume data. A "parallax image" represents an individual image constituting the "parallax image group". In other words, the "parallax image group" is composed of a plurality of "parallax images" whose viewpoint positions are different from one another.

The workstation 130 according to the first embodiment is a sophisticated computer suitable for image processing and the like, and includes an input unit 131, a display unit 132, a communication unit 133, a storage unit 134, a control unit 135, and a rendering processing unit 136. An explanation will be made of the case where the workstation 130 is a sophisticated computer suitable for image processing and the like. However, the workstation 130 is not limited thereto, and may be an arbitrary information processing apparatus. The workstation 130 may be an arbitrary personal computer, for example.

The input unit 131 is a mouse, a keyboard, and a trackball, for example, and receives input of various types of operations from the operator to the workstation 130. Specifically, the input unit 131 according to the first embodiment receives input of information used for acquiring volume data to be a target of rendering processing from the image storage device 120. The input unit 131 receives input of a patient ID, an examination ID, an apparatus ID, and a series ID, for example. Furthermore, the input unit 131 according to the first embodiment receives input of conditions related to rendering processing (rendering conditions).

The display unit 132 is a liquid crystal panel as a stereoscopic display monitor, for example, and displays various types of information. Specifically, the display unit 132 according to the first embodiment displays a graphical user interface (GUI) for receiving various types of operations from the operator, a parallax image group, and the like. The display unit 132 is a two-parallax monitor or a nine-parallax monitor, for example. An explanation will be made of the case where the display unit 132 is a nine-parallax monitor. The communication unit 133 is a network interface card (NIC), for example, and performs communications with other devices.

The storage unit 134 is a hard disk or a semiconductor memory element, for example, and stores therein various types of information. Specifically, the storage unit 134 according to the first embodiment stores therein volume data acquired from the image storage device 120 via the communication unit 133. Furthermore, the storage unit 134 according to the first embodiment stores therein volume data being subjected to rendering processing, a parallax image group generated by the rendering processing, and other information.

The control unit 135 is an electronic circuit, such as a central processing unit (CPU) and a micro processing unit (MPU), or an integrated circuit, such as an application specific integrated circuit (ASIC) and a field programmable gate array (FPGA), for example, and controls the workstation 130 collectively.

The control unit 135 according to the first embodiment, for example, controls display of the GUI and display of a parallax image group on the display unit 132. The control unit 135, for example, controls transmission and reception of volume data and a parallax image group to and from the image storage device 120 via the communication unit 133. The control unit 135, for example, controls rendering processing performed by the rendering processing unit 136. The control unit 135, for example, controls reading of volume data from the storage unit 134 and storing of a parallax image group in the storage unit 134.

The rendering processing unit 136 performs various types of rendering processing on volume data acquired from the image storage device 120 under the control of the control unit 135 to generate a parallax image group. Specifically, the rendering processing unit 136 according to the first embodiment reads volume data from the storage unit 134, and performs preprocessing on the volume data first. The rendering processing unit 136 then performs volume rendering processing on the volume data subjected to the preprocessing to generate a parallax image group. Subsequently, the rendering processing unit 136 generates a two-dimensional image on which various types of information (e.g., a scale, a patient's name, and an examination item) are depicted, and superimposes the two-dimensional image on each image of the parallax image group, thereby generating a two-dimensional image to be output. The rendering processing unit 136 then stores the parallax image group thus generated and the two-dimensional image to be output in the storage unit 134. In the first embodiment, the rendering processing represents the entire image processing performed on volume data, and the volume rendering processing represents processing for generating a two-dimensional image on which three-dimensional information is reflected in the rendering processing. A medical image generated by the rendering processing corresponds to a parallax image, for example.

Figure 5:
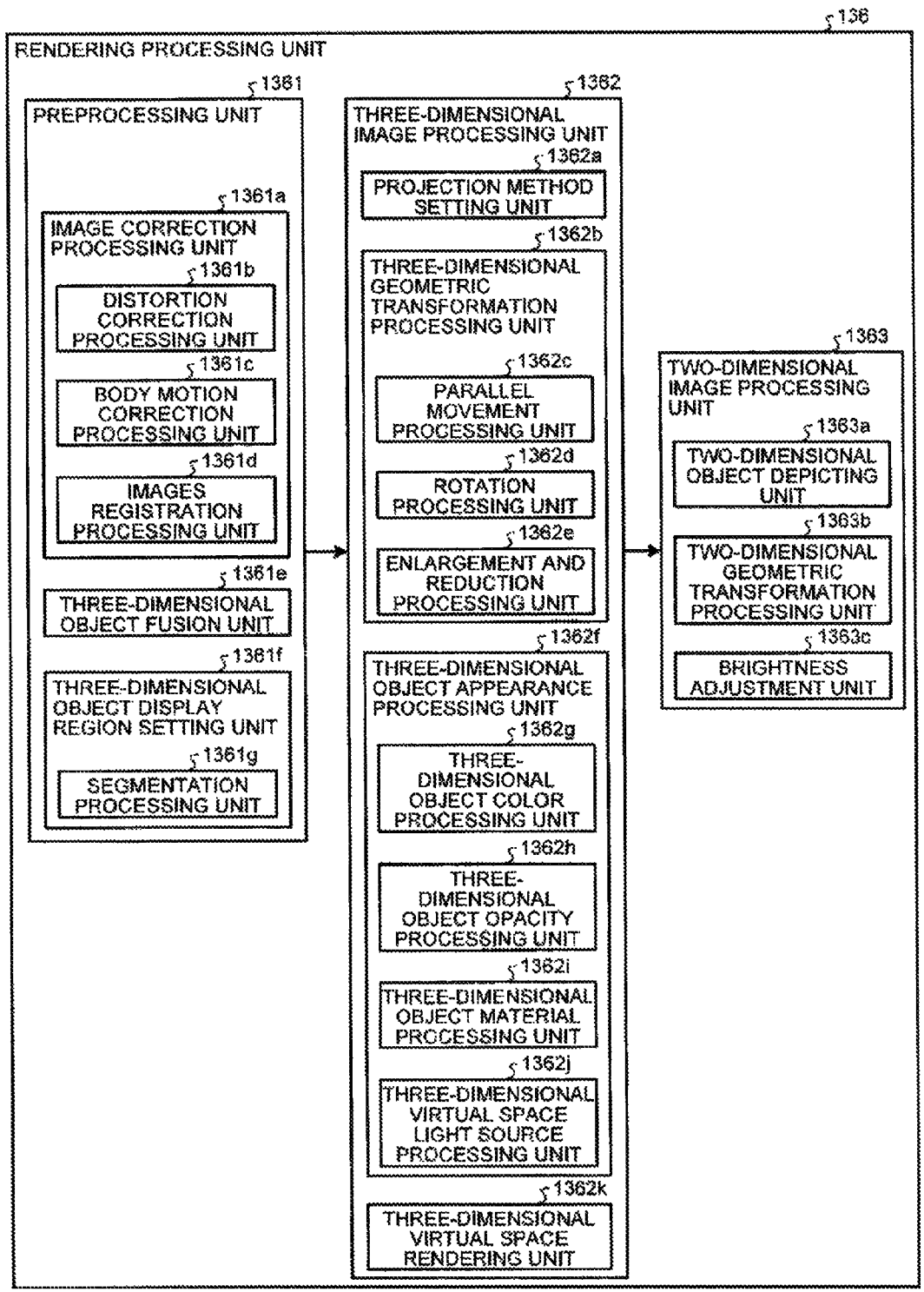
FIG. 5 is a diagram for explaining an exemplary configuration of a rendering processing unit illustrated in FIG. 4.

FIG. 5 is a diagram for explaining an exemplary configuration of the rendering processing unit illustrated in FIG. 4. As illustrated in FIG. 5, the rendering processing unit 136 includes a preprocessing unit 1361, a three-dimensional image processing unit 1362, and a two-dimensional image processing unit 1363. The preprocessing unit 1361 performs preprocessing on volume data. The three-dimensional image processing unit 1362 generates a parallax image group from the volume data subjected to the preprocessing. The two-dimensional image processing unit 1363 generates a two-dimensional image to be output that is obtained by superimposing various types of information on the parallax image group. The units will be explained below in order.

The preprocessing unit 1361 is a processing unit that performs various types of preprocessing when rendering processing is performed on volume data, and includes an image correction processing unit 1361a, a three-dimensional object fusion unit 1361e, and a three-dimensional object display region setting unit 1361f.

The image correction processing unit 1361a is a processing unit that performs image correction processing when two types of volume data are processed as one piece of volume data, and includes a distortion correction processing unit 1361b, a body motion correction processing unit 1361c, and an images registration processing unit 1361d as illustrated in FIG. 5. The image correction processing unit 1361a performs image correction processing when volume data of a PET image and volume data of an X-ray CT image generated by a PET-CT apparatus are processed as one piece of volume data, for example. Alternatively, the image correction processing unit 1361a performs image correction processing when volume data of a T1-weighted image and volume data of a T2-weighted image generated by an MRI apparatus are processed as one piece of volume data.

The distortion correction processing unit 1361b corrects distortion of data in individual volume data caused by acquisition conditions in data acquisition performed by the medical image diagnosis apparatus 110. The body motion correction processing unit 1361c corrects movement caused by body motion of the subject during a time period for acquiring data used for generating individual volume data. The images registration processing unit 1361d performs registration using a cross-correlation method, for example, between two pieces of volume data on which the correction processing is performed by the distortion correction processing unit 1361*b* and the body motion correction processing unit 1361*c*.

The three-dimensional object fusion unit 1361*e* fuses a plurality of pieces of volume data on which registration is performed by the images registration processing unit 1361*d*. The processing performed by the image correction processing unit 1361*a* and the three-dimensional object fusion unit 1361*e* is omitted if rendering processing is performed on a single piece of volume data.

The three-dimensional object display region setting unit 1361*f* is a processing unit that sets a display region corresponding to an organ to be displayed that is specified by the operator, and includes a segmentation processing unit 1361*g*. The segmentation processing unit 1361*g* is a processing unit that extracts an organ, such as a heart, a lung, and a blood vessel, specified by the operator with a region growing method based on the pixel value of volume data (voxel value), for example.

If the operator specifies no organ to be displayed, the segmentation processing unit 1361*g* performs no segmentation processing. By contrast, if the operator specifies a plurality of organs to be displayed, the segmentation processing unit 1361*g* extracts a plurality of organs corresponding thereto. The processing of the segmentation processing unit 1361*g* may be performed again in response to a request for fine adjustment made by the operator who refers to a rendering image.

The three-dimensional image processing unit 1362 performs volume rendering processing on the volume data on which the preprocessing is performed by the preprocessing unit 1361. The three-dimensional image processing unit 1362 serves as a processing unit that performs volume rendering processing, and includes a projection method setting unit 1362*a*, a three-dimensional geometric transformation processing unit 1362*b*, a three-dimensional object appearance processing unit 1362*f*, and a three-dimensional virtual space rendering unit 1362*k*.

The projection method setting unit 1362*a* determines a projection method for generating a parallax image group. The projection method setting unit 1362*a* determines whether the volume rendering processing is performed by a parallel projection method or a perspective projection method, for example.

The three-dimensional geometric transformation processing unit 1362*b* is a processing unit that determines information used for three-dimensionally geometrically transforming volume data on which the volume rendering processing is to be performed, and includes a parallel movement processing unit 1362*c*, a rotation processing unit 1362*d*, an enlargement and reduction processing unit 1362*e*. The parallel movement processing unit 1362*c* is a processing unit that determines a movement amount by which the volume data is moved in a parallel manner if the viewpoint position is moved in a parallel manner when the volume rendering processing is being performed. The rotation processing unit 1362*d* is a processing unit that determines a movement amount by which the volume data is moved rotationally if the viewpoint position is moved rotationally when the volume rendering processing is being performed. The enlargement and reduction processing unit 1362*e* is a processing unit that determines an enlargement ratio and a reduction ratio of the volume data if enlargement and reduction of the parallax image group is requested.

The three-dimensional object appearance processing unit 1362*f* includes a three-dimensional object color processing unit 1362*g*, a three-dimensional object opacity processing unit 1362*h*, a three-dimensional object material processing unit 1362*i*, and a three-dimensional virtual space light source processing unit 1362*j*. The three-dimensional object appearance processing unit 1362*f* performs processing for determining a display aspect of the parallax image group to be displayed by these processing units in response to a request made by the operator, for example.

The three-dimensional object color processing unit 1362*g* is a processing unit that determines a color applied to each region segmented in the volume data. The three-dimensional object opacity processing unit 1362*h* is a processing unit that determines the opacity of each voxel constituting each region segmented in the volume data. A region behind a region whose opacity is determined to be "100%" in the volume data is not depicted in the parallax image group. Furthermore, a region whose opacity is determined to be "0%" in the volume data is not depicted in the parallax image group.

The three-dimensional object material processing unit 1362*i* is a processing unit that determines a material of each region segmented in the volume data to adjust texture when the region is depicted. The three-dimensional virtual space light source processing unit 1362*j* is a processing unit that determines a position of a virtual light source arranged in a three-dimensional virtual space and a type of the virtual light source when the volume rendering processing is performed on the volume data. Examples of the type of the virtual light source include a light source that emits parallel light beams from infinity and a light source that emits radial light beams from the viewpoint.

The three-dimensional virtual space rendering unit 1362*k* performs volume rendering processing on volume data to generate a parallax image group. To perform the volume rendering processing, the three-dimensional virtual space rendering unit 1362*k* uses various types of information determined by the projection method setting unit 1362*a*, the three-dimensional geometric transformation processing unit 1362*b*, and the three-dimensional object appearance processing unit 1362*f* as needed.

The volume rendering processing is performed by the three-dimensional virtual space rendering unit 1362*k* in accordance with rendering conditions. Examples of the rendering conditions include "the parallel projection method" and "the perspective projection method". Examples of the rendering conditions also include "a reference viewpoint position and a parallactic angle". Examples of the rendering conditions also include "parallel movement of the viewpoint position", "rotational movement of the viewpoint position", "enlargement of the parallax image group", and "reduction of the parallax image group". Examples of the rendering conditions also include "a color to be applied", "transmittance", "texture", "the position of the virtual light source", and "the type of the virtual light source". Such rendering conditions may be received from the operator via the input unit 131, or may be set by default. In both cases, the three-dimensional virtual space rendering unit 1362*k* receives the rendering conditions from the control unit 135, and performs the volume rendering processing on the volume data in accordance with the rendering conditions. At this time, the projection method setting unit 1362*a*, the three-dimensional geometric transformation processing unit 1362*b*, and the three-dimensional object appearance processing unit 1362*f* determine required various types of information in accordance with the rendering conditions. As a result, the three-dimensional virtual space rendering unit 1362k uses the various types of information thus determined to generate the parallax image group.

Figure 6A:
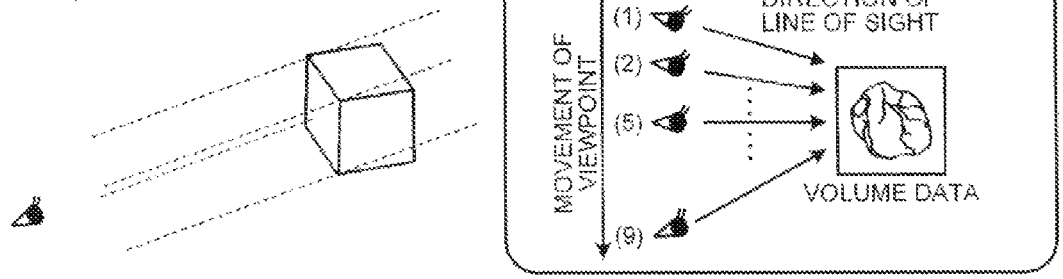
FIG. 6A, FIG. 6B, and FIG. 6C are schematics for explaining an example of volume rendering processing according to the first embodiment.
Figure 6B:
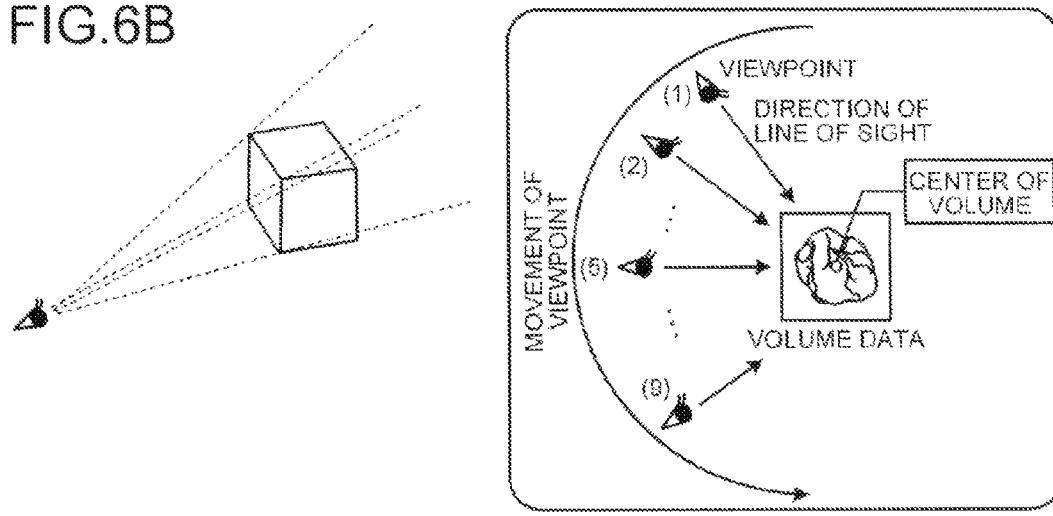
Figure 6C:
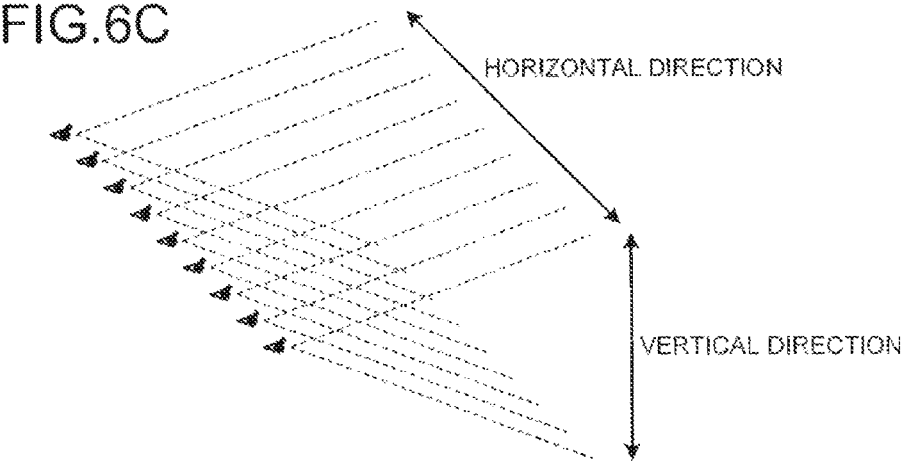

FIG. 6A, FIG. 6B, and FIG. 6C are schematics for explaining an example of volume rendering processing according to the first embodiment. An assumption is made that the three-dimensional virtual space rendering unit 1362k receives the parallel projection method, and receives a reference viewpoint position (5) and a parallactic angle of "one degree" as the rendering conditions as illustrated in FIG. 6A, for example. In this case, the three-dimensional virtual space rendering unit 1362k sets a light source that emits parallel light beams from infinity along a direction of a line of sight as illustrated in FIG. 6A. The three-dimensional virtual space rendering unit 1362k then moves the position of the viewpoint from (1) to (9) in a parallel manner by a parallactic angle of "one degree". Thus, the three-dimensional virtual space rendering unit 1362k generates nine parallax images whose parallactic angles (angles between the directions of the lines of sight) are set to one degree by the parallel projection method.

Alternatively, an assumption is made that the three-dimensional virtual space rendering unit 1362k receives the perspective projection method, and receives a reference viewpoint position (5) and a parallactic angle of "one degree" as the rendering conditions as illustrated in FIG. 6B. In this case, the three-dimensional virtual space rendering unit 1362k sets a point light source or a surface light source that emits light in a three-dimensionally radial manner about the direction of the line of sight for each viewpoint as illustrated in FIG. 6B. The three-dimensional virtual space rendering unit 1362k then moves the position of the viewpoint from (1) to (9) rotationally by a parallactic angle of "one degree" about the center (the center of gravity) of a section of the volume data, for example. Thus, the three-dimensional virtual space rendering unit 1362k generates nine parallax images whose parallactic angles are set to one degree by the perspective projection method. If the perspective projection method is employed, the viewpoints (1) to (9) may be realized by parallel movement depending on the rendering conditions. As illustrated in FIG. 6A and FIG. 6B, the direction of the line of sight is a direction toward the center (the center of gravity) of a section of the volume data from the viewpoint.

Still alternatively, as illustrated in FIG. 6C, the three-dimensional virtual space rendering unit 1362k sets a light source that emits light in a two-dimensionally radial manner about the direction of the line of sight with respect to the vertical direction of the displayed volume rendering image and emits parallel light beams from infinity along the direction of the line of sight with respect to the horizontal direction of the displayed volume rendering image. Thus, the three-dimensional virtual space rendering unit 1362k may perform volume rendering processing by combining the parallel projection method and the perspective projection method.

The nine parallax images thus generated is a parallax image group. In the first embodiment, for example, the nine parallax images are converted into an intermediate image in which the nine-parallax images are arranged in a predetermined format (e.g., a grid pattern) by the control unit 135, and are output to the display unit 132 serving as a stereoscopic display monitor. As a result, the operator of the workstation 130 can perform an operation for generating the parallax image group while checking the medical image that is displayed on the stereoscopic display monitor and capable of being viewed stereoscopically.

In the example illustrated in FIG. 6A, FIG. 6B, and FIG. 6C, the explanation has been made of the case where the projection method, and the reference viewpoint position and the parallactic angle are received as the rendering conditions. However, if other conditions are received as the rendering conditions, the three-dimensional virtual space rendering unit 1362k also generates a parallax image group while reflecting each rendering condition.

Furthermore, the three-dimensional virtual space rendering unit 1362k has a function to perform multi planer reconstruction (MPR) to reconstruct an MPR image from volume data in addition to volume rendering. The three-dimensional virtual space rendering unit 1362k also has a function to perform "curved MPR" and a function to perform "intensity projection".

Subsequently, the parallax image group generated from the volume data by the three-dimensional image processing unit 1362 is used as an underlay. By superimposing an overlay on which various types of information (e.g., a scale, a patient's name, and an examination item) are superimposed on the underlay, a two-dimensional image to be output is generated. The two-dimensional image processing unit 1363 is a processing unit that generates a two-dimensional image to be output by performing image processing on an overlay and an underlay, and includes a two-dimensional object depicting unit 1363a, a two-dimensional geometric transformation processing unit 1363b, and a brightness adjustment unit 1363c as illustrated in FIG. 5. To reduce load required for generating the two-dimensional image to be output, for example, the two-dimensional image processing unit 1363 superimposes one overlay on each of the nine parallax images (underlays), thereby generating nine two-dimensional images to be output.

The two-dimensional object depicting unit 1363a is a processing unit that depicts various types of information to be depicted on an overlay. The two-dimensional geometric transformation processing unit 1363b is a processing unit that performs parallel movement processing or rotational movement processing on the positions of the various types of information depicted on the overlay and that performs enlargement processing or reduction processing on the various types of information depicted on the overlay.

The brightness adjustment unit 1363c is a processing unit that performs brightness transformation processing and that adjusts the brightness of an overlay and an underlay depending on parameters for image processing, such as gradation of the stereoscopic display monitor to which the two-dimensional image is output, the window width (WW), and the window level (WL), for example.

The two-dimensional images to be output that are generated in this manner are stored in the storage unit 134 by the control unit 135, for example, and are transmitted to the image storage device 120 via the communication unit 133. If the terminal device 140 acquires the two-dimensional images to be output from the image storage device 120, converts the two-dimensional images into an intermediate image in which the two-dimensional images are arranged in a predetermined format (e.g., a grid pattern), and displays the intermediate image on the stereoscopic display monitor, for example, the doctor or the laboratory technician who is the observer can browse the medial image capable of being viewed stereoscopically with the various types of information (e.g., a scale, a patient's name, and an examination item) depicted thereon. Alternatively, the two-dimensional images to be output are transmitted to the terminal device 140 directly by the control unit 135 via the communication unit 133, for example.

Figure 7:
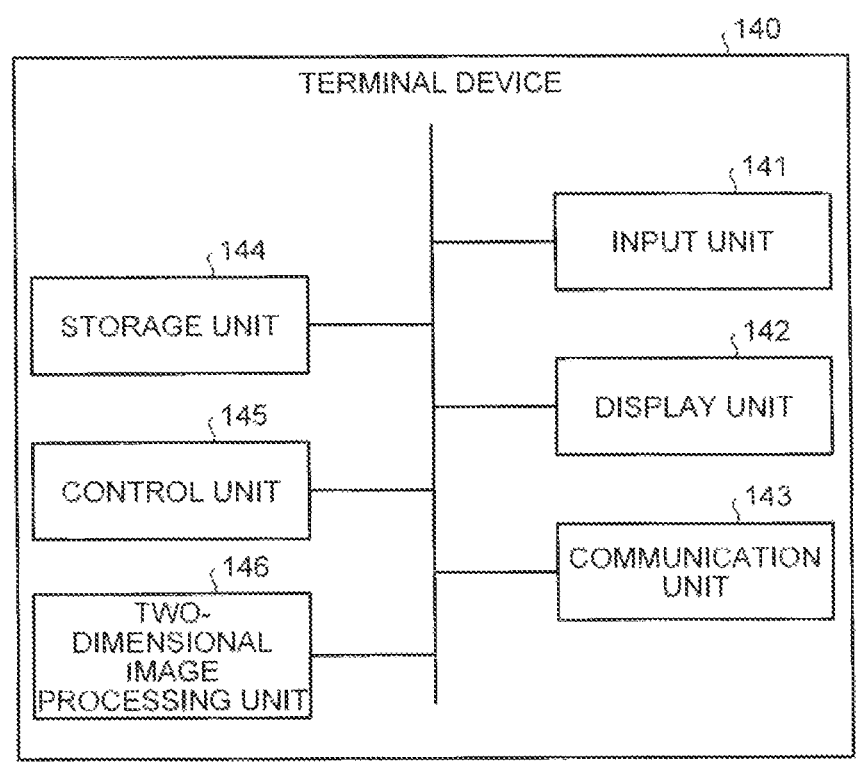
FIG. 7 is a diagram for explaining an exemplary configuration of a terminal device according to the first embodiment.

The terminal device 140 according to the first embodiment is a device by which a doctor or a laboratory technician who works for the hospital browses a medical image as described above, and acquires the parallax image group (two-dimensional images to be output) generated by the rendering processing unit 136 from the image storage device 120 or the workstation 130. FIG. 7 is a diagram for explaining an exemplary configuration of the terminal device according to the first embodiment.

As illustrated in FIG. 7, the terminal device 140 according to the first embodiment includes an input unit 141, a display unit 142, a communication unit 143, a storage unit 144, a control unit 145, and a two-dimensional image processing unit 146.

The input unit 141 is a mouse, a keyboard, and a trackball, for example, and receives input of various types of operations from the operator to the terminal device 140. Specifically, the input unit 141 according to the first embodiment receives a request for stereoscopic vision from the operator. The input unit 141, for example, receives a patient ID, an examination ID, an apparatus ID, and a series ID for specifying volume data requested to be displayed for radiogram interpretation by the operator as the request for stereoscopic vision.

The display unit 142 is a liquid crystal panel as a stereoscopic display monitor, for example, and displays various types of information. Specifically, the display unit 142 according to the first embodiment displays a GUI for receiving various types of operations from the operator, a stereoscopic image, and the like. The display unit 142 is a two-parallax monitor or a nine-parallax monitor, for example. An explanation will be made of the case where the display unit 142 is a nine-parallax monitor.

The communication unit 143 is a NIC, for example, and performs communications with other devices. The communication unit 143 according to the first embodiment, for example, transmits the information related to the request for stereoscopic vision received by the input unit 141 to the image storage device 120. Furthermore, the communication unit 143 according to the first embodiment receives a parallax image group and the like transmitted from the image storage device 120 or the workstation 130 in response to the request for stereoscopic vision.

The storage unit 144 is a hard disk or a semiconductor memory element, for example, and stores therein various types of information. Specifically, the storage unit 144 according to the first embodiment stores therein a parallax image group and the like acquired from the image storage device 120 or the workstation 130 via the communication unit 143. Furthermore, the storage unit 144 stores therein additional information (e.g., the parallax number and the resolution) of the parallax image group acquired from the image storage device 120 or the workstation 130 via the communication unit 143.

The control unit 145 is an electronic circuit, such as a CPU and an MPU, or an integrated circuit, such as an ASIC and an FPGA, and controls the terminal device 140 collectively.

The control unit 145, for example, controls transmission and reception of a display request to and from the image storage device 120 via the communication unit 143 and transmission and reception of a parallax image group and the like to and from the image storage device 120 or the workstation 130 via the communication unit 143. The control unit 145, for example, controls storing of a parallax image group and the like in the storage unit 144 and reading of a parallax image group and the like from the storage unit 144.

The control unit 145 according to the first embodiment controls display of the GUI and display of a parallax image group on the display unit 142. The control unit 145 according to the first embodiment converts the parallax image group into an intermediate image in which the parallax image group is arranged in a predetermined format (e.g., a grid pattern), and outputs the intermediate image to the display unit 142, which is a nine-parallax monitor.

Furthermore, the control unit 145 according to the first embodiment controls image processing performed by the two-dimensional image processing unit 146.

The two-dimensional image processing unit 146 has the same function as that of the two-dimensional image processing unit 1363 explained with reference to FIG. 5. In other words, the two-dimensional image processing unit 146 generates overlays, and superimposes the overlays on the parallax image group serving as underlays generated by the three-dimensional image processing unit 1362, thereby generating two-dimensional images to be output to the display unit 142.

As described above, the rendering processing unit 136 generates the parallax image group from the volume data under the control of the control unit 135. Furthermore, the terminal device 140 acquires the parallax image group, and displays the parallax image group on the display unit 142. This operation allows the doctor or the laboratory technician who is the operator of the terminal device 140 to browse the medial image capable of being viewed stereoscopically with the various types of information (e.g., a scale, a patient's name, and an examination item) depicted thereon.

Figure 8:
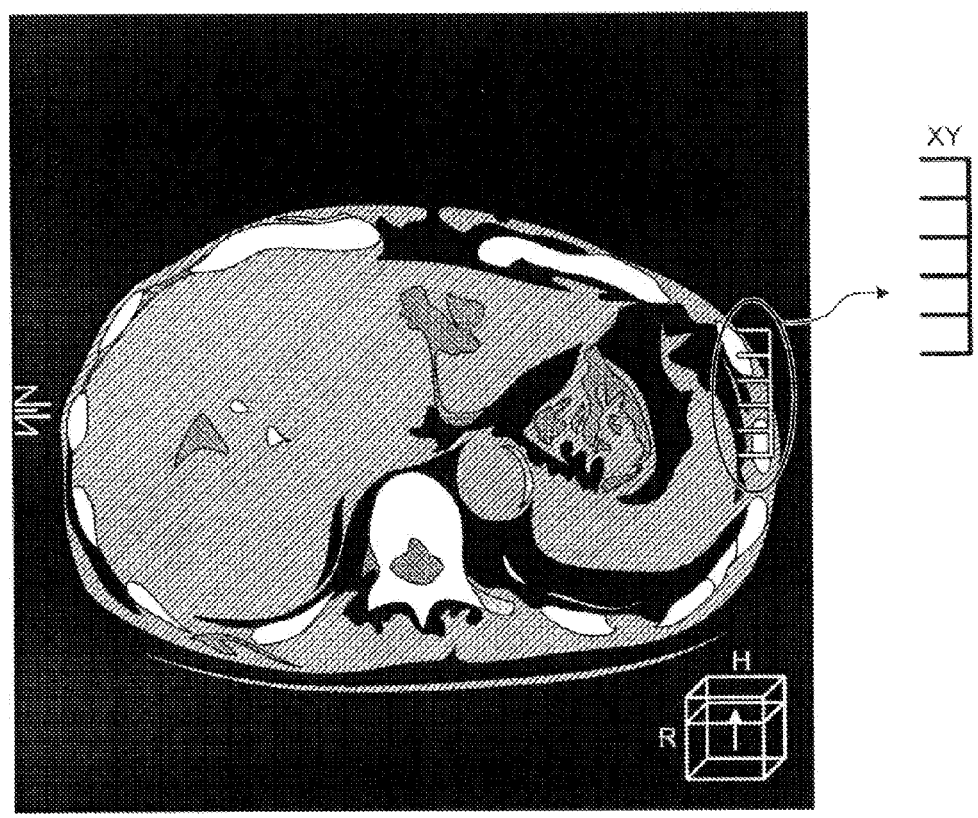
FIG. 8 is a schematic for explaining a conventional scale.

Conventionally, when a two-dimensional image obtained by cutting volume data along a predetermined section is displayed on a general-purpose monitor two-dimensionally, a scale (a gauge) in the X-Y direction for causing the two-dimensional image to correspond to a real space of a captured site in the volume data is displayed. The scale in the X-Y direction converts the lengths in the lateral direction and the longitudinal direction of the two-dimensional image being displayed on the monitor into the lengths of the real space corresponding to the two-dimensional image. FIG. 8 is a schematic for explaining the conventional scale.

As illustrated in FIG. 8, for example, the general-purpose monitor displays an axial image obtained by cutting volume data generated by an X-ray CT apparatus along an axial plane and a scale (a gauge) in the X-Y direction for causing the axial image to correspond to a real space. By referring to the scale in the X-Y direction, the observer of the general-purpose monitor (e.g., a radiologist) can roughly grasp the size of a region of interest depicted in the axial image in the X-Y direction.

Figure 9:
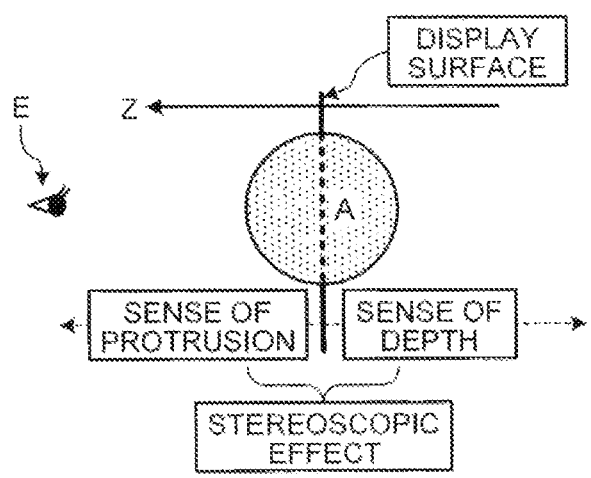
FIG. 9 is a schematic for explaining a stereoscopic image space.

By contrast, a stereoscopic image is sensed by the observer stereoscopically in a stereoscopic image space. FIG. 9 is a schematic for explaining the stereoscopic image space.

As illustrated in FIG. 9, the observer who refers to the parallax image group displayed on the stereoscopic display monitor views a stereoscopic image A stereoscopically in the stereoscopic image space. As illustrated in FIG. 9, the stereoscopic effect sensed by the observer is roughly divided into a sense of protrusion and a sense of depth. The sense of protrusion is a feeling sensed by the observer as if the stereoscopic image protrudes in a direction closer to the viewpoint of the observer (an observer viewpoint E) with respect to the display surface of the stereoscopic display monitor. By contrast, the sense of depth is a feeling sensed by the observer as if the stereoscopic image recedes in a direction away from the viewpoint of the observer (observer viewpoint E) with respect to the display surface of the stereoscopic display monitor.

Hereinafter, the direction closer to the viewpoint of the observer with respect to the display surface of the stereoscopic display monitor is referred to as a "protruding direction", whereas the direction away from the viewpoint of the observer with respect to the display surface of the stereoscopic display monitor is referred to as a "depth direction". Specifically, the "protruding direction" and the "depth direction" are perpendicular to the display surface of the stereoscopic display monitor in the stereoscopic image space. In other words, the direction perpendicular to the display surface of the stereoscopic display monitor in the stereoscopic image space is a "Z-direction" perpendicular to both the X-direction and the Y-direction as illustrated in FIG. 9.

Even if the observer of the stereoscopic display monitor, such as a nine-parallax monitor, refers to the scale in the X-Y direction, for example, the observer fails to grasp the size in the stereoscopic image space sensed by the observer stereoscopically, in particular, the size in the Z-direction.

Figure 10:
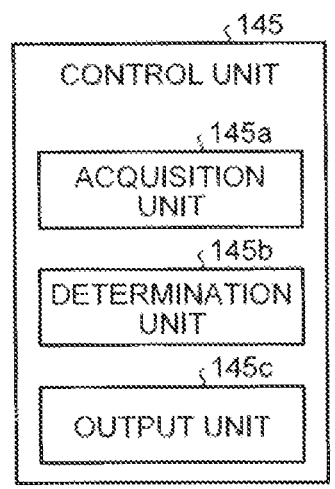
FIG. 10 is a diagram for explaining an exemplary configuration of a control unit of the terminal device according to the first embodiment.

To address this, the control unit 145 of the terminal device 140 according to the first embodiment is configured as illustrated in FIG. 10, for example, so as to display a gauge (a scale) for causing the image viewed stereoscopically by the observer on the monitor enabling stereoscopic vision to correspond to a real space. FIG. 10 is a diagram for explaining an exemplary configuration of the control unit of the terminal device according to the first embodiment.

As illustrated in FIG. 10, the control unit 145 includes an acquisition unit 145a, a determination unit 145b, and an output unit 145c.

The acquisition unit 145a acquires rendering conditions used for generating a parallax image group that is parallax images of a predetermined parallax number from volume data that is three-dimensional medical image data. The determination unit 145b sets corresponding information for causing a space coordinate of a stereoscopic image viewed stereoscopically by referring to the stereoscopic display monitor that displays the parallax image group (coordinates of the stereoscopic image space) to correspond to a space coordinate of a captured site in the volume data (coordinates in the real space) based on at least the parallactic angle between the parallax images constituting the parallax image group included in the rendering condition and the display size of the parallax image group displayed on the stereoscopic display monitor.

Based on the corresponding information, the determination unit 145b determines a scale for converting the length in the direction perpendicular to the display surface of the stereoscopic display monitor in the stereoscopic image space into the length in the real space. The output unit 145c performs output control such that the scale is displayed on the stereoscopic display monitor in a manner superimposed on the stereoscopic image based on the parallax image group.

An example of the processing performed by the acquisition unit 145a, the determination unit 145b, and the output unit 145c will now be described. The processing performed by the acquisition unit 145a, the determination unit 145b, and the output unit 145c is performed after nine-parallax images are transmitted to the control unit 145. In other words, the workstation 130 acquires volume data specified by the operator of the terminal device 140 from the image storage device 120, and generates nine-parallax images that is a parallax image group to be output to the display unit 142 serving as a nine-parallax monitor from the volume data thus acquired. The rendering processing unit 136, for example, generates the nine-parallax images based on the rendering conditions (e.g., a parallax number, a parallactic angle, and a projection method and positional information of the viewpoint) input by the operator of the terminal device 140. The control unit 135 then controls the communication unit 133 so as to transmit the nine-parallax images generated by the rendering processing unit 136 to the terminal device 140. The communication unit 143 of the terminal device 140 transfers the nine-parallax images thus received to the control unit 145.

In the description below, a coordinate system of volume data is represented by orthogonal three-axis coordinates of (x, y, z). The x-direction is the horizontal direction in the real space coordinates. The y-direction is the vertical direction in the real space coordinates. The z-direction is a direction perpendicular to the x-y plane in the real space coordinates, specifically, a direction corresponding to the "depth direction". In other words, the positive direction in the z-direction is the "depth direction", and the negative direction in the z-direction is the "protruding direction".

Furthermore, in the description below, a coordinate system of the stereoscopic image space is represented by orthogonal three-axis coordinates of (X, Y, Z). The X-direction is the horizontal direction (lateral direction of the display surface) in the stereoscopic image space coordinates. The Y-direction is the vertical direction (longitudinal direction of the display surface) in the stereoscopic image space coordinates. The Z-direction is a direction corresponding to the "depth direction" in the stereoscopic image space coordinates. In other words, the positive direction in the Z-direction is the "depth direction", and the negative direction in the Z-direction is the "protruding direction".

The acquisition unit 145a acquires the rendering conditions. The determination unit 145b then sets corresponding information for causing the coordinates of the stereoscopic image space to correspond to the coordinates of the real space based on the parallactic angle of the nine-parallax images included in the rendering conditions and the display size of the nine-parallax images displayed on the display unit 142. Specifically, the determination unit 145b sets the corresponding information in the X-Y direction based on the display size, and sets the corresponding information in the Z-direction based on the parallactic angle and the display size. The display size is input together with the rendering conditions by the operator of the terminal device 140 to be acquired, for example.

An assumption is made that the volume data is composed of voxels of "500×500×500" and that the size of one voxel is "0.5 mm×0.5 mm×0.5 mm".

In this case, 10 voxels correspond to 5 mm in the x-y plane of the volume data. If the display size is "one voxel: 1.0 mm", the determination unit 145b sets corresponding information indicating "10 pixels: 10 mm" in the X-Y plane. The determination unit 145b then determines the scale in the X-Y direction to be "10 pixels: 10 mm". The setting processing described above is a method applied to the parallel projection method in which, even if projection processing for volume rendering is performed, the size of the x-y plane is nearly equal to the size of the X-Y plane.

Figure 11A:
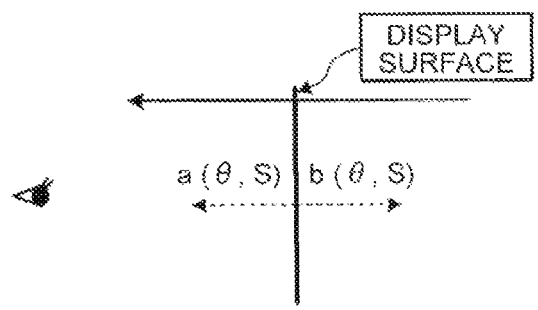
FIG. 11A is a schematic for explaining an example of parameters used for setting corresponding information in a Z-direction.

By contrast, the determination unit 145b sets corresponding information in the Z-direction by using parameters illustrated in FIG. 11A, for example. FIG. 11A is a schematic for explaining an example of the parameters used for setting the corresponding information in the Z-direction.

In the case of a nine-parallax monitor, the stereoscopic effect of a stereoscopic image depends on a parallactic angle (θ) and a display size (S). Therefore, as illustrated in FIG. 11A, the determination unit 145b uses parameters "a(θ,S)" and "b(θ,S)" where the parallax angel (θ) and the display size (S) are variables. The parameters "a(θ,S)" and "b(θ,S)" are parameters set in advance depending on the specifications of the stereoscopic display monitor, and are information set by an administrator of the image processing system 1, for example.

As illustrated in FIG. 11A, "a(θ,S)" is a parameter used for setting corresponding information in the protruding direction. By contrast, as illustrated in FIG. 11A, "b(θ,S)" is a parameter used for setting corresponding information in the depth direction. Specifically, "a(θ,S)" is a protruding amount (unit: mm) in the case where the parallactic angle is "θ" and the display size is "S". By contrast, "b(θ,S)" is a depth amount (unit: mm) in the case where the parallactic angle is "θ" and the display size is "S".

An assumption is made that "a(θ,S)" is "5 mm" in the case where "θ" is "one degree" and "S" is "one voxel: 1.0 mm", for example. Furthermore, an assumption is made that "b(θ,S)" is "5 mm" in the case where "θ" is "one degree" and "S" is "one voxel: 1.0 mm". In this case, the determination unit 145b sets corresponding information indicating that "1 mm on the display surface corresponds to 5 mm in the real space" in the Z-direction. The determination unit 145b then determines the scale in the Z-direction to be "10 mm on the display surface: 50 mm in the real space".

The explanation has been made of the case where reduction scales on the front side and the rear side of the display surface are equal to each other in the scale in the Z-direction because "a(θ,S)" and "b(θ,S)" are the same value. However, if "a(θ,S)" and "b(θ,S)" are different values, the determination unit 145b may determine the scale in the Z-direction in which reduction scales on the front side and the rear side of the display surface are different from each other. In other words, the determination unit 145b may determine the scale in the Z-direction in which reduction scales in the protruding direction and the depth direction with respect to the display surface are different from each other in accordance with the corresponding information.

Alternatively, if "a(θ,S)" and "b(θ,S)" are different values, the determination unit 145b may determine the scale in the Z-direction in which the reduction scales on the front side and the rear side of the display surface are equal to each other by using the average value of "a(θ,S)" and "b(θ,S)".

The stereoscopic effect sensed by the observer who refers to the display unit 142 has a limit depending on the specifications of the display unit 142. In other words, the amount in the protruding direction (protruding amount) capable of being displayed by the display unit 142 and the amount in the depth direction (depth amount) capable of being displayed by the display unit 142 have a limit depending on the specifications of the display unit 142. Hereinafter, a limit value of the protruding amount is referred to as a "protruding limit value", whereas a limit value of the depth amount is referred to as a "depth limit value".

In other words, the corresponding information in the protruding direction and the corresponding information in the depth direction set by the determination unit 145b based on "a(θ,S)" and "b(θ,S)" need to be modified in accordance with the "protruding limit value" and the "depth limit value".

For this reason, the determination unit 145b calculates the "protruding limit value" and the "depth limit value" based on hardware specifications of the stereoscopic display monitor. Specifically, the determination unit 145b calculates a protruding limit amount and a depth limit amount based on a "visual distance", which is a distance between the display surface of the stereoscopic display monitor and the observer who observes the stereoscopic display monitor" and the hardware specifications of the stereoscopic display monitor. The visual distance between the stereoscopic display monitor and the observer fails to be obtained if the position of the observer is not specified. Generally, however, the display unit 142 and the like serving as a stereoscopic display monitor are designed by assuming an observation position from which the stereoscopic display monitor is observed to be a predetermined position. Therefore, the determination unit 145b calculates the protruding limit amount and the depth limit amount based on an "assumed visual distance", which is a distance between the observation position assumed to be the predetermined position and the display surface of the stereoscopic display monitor.

An example of the protruding limit amount and the depth limit amount calculated by the determination unit 145b will now be described. The determination unit 145b calculates the protruding limit amount by Equation (1), for example. Furthermore, the determination unit 145b calculates the depth limit amount by Equation (2), for example. In Equation (1) and Equation (2), the direction closer to the viewpoint of the observer with respect to the display surface is negative, and the direction away from the viewpoint of the observer with respect to the display surface is positive in the depth direction with the origin at the display surface of the stereoscopic display monitor.

Protruding Limit Amount (mm)=−Assumed Visual Distance/{2×[(Assumed Visual Distance+Gap)/ Assumed Visual Distance]×(Sub-Pixel Pitch/ Gap)×Protruding Limit Frequency+1} (1)

Depth Limit Amount (mm)=Assumed Visual Distance/{2×[(Assumed Visual Distance+Gap)/Assumed Visual Distance]×(Sub-Pixel Pitch/Gap)× Protruding Limit Frequency−1} (2)

Figure 11B:
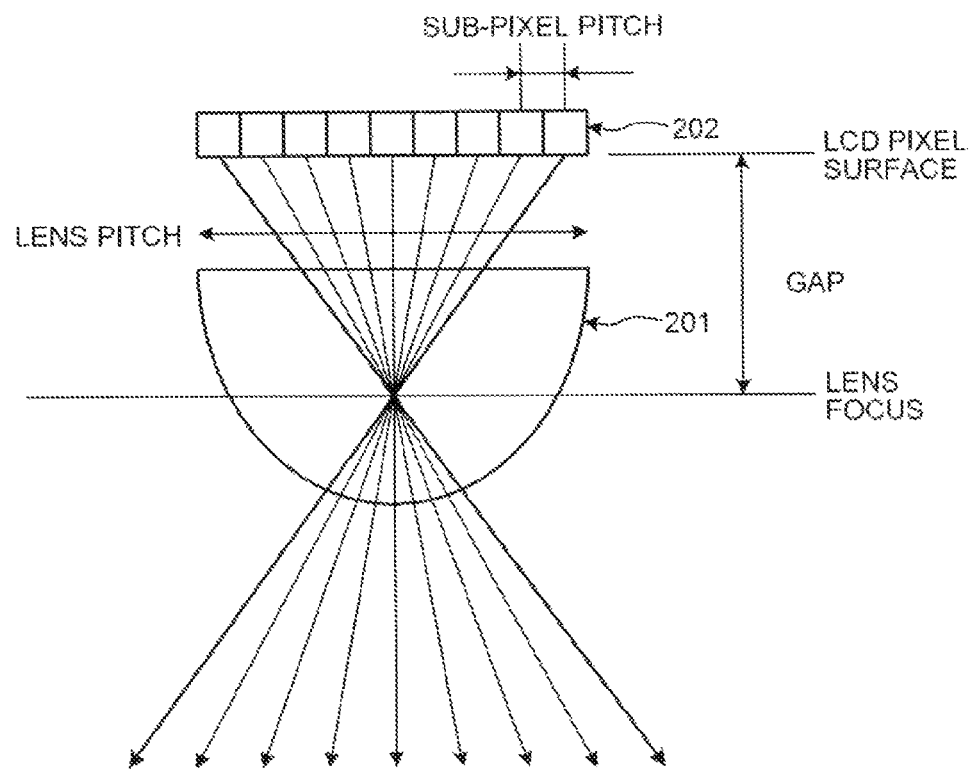
FIG. 11B is a schematic for explaining a parameter used for modifying the corresponding information in the Z-direction set by the parameters exemplified in FIG. 11A.

The "gap", the "sub-pixel pitch", and other elements in Equation (1) and Equation (2) will now be described with reference to FIG. 11B. FIG. 11B is a schematic for explaining a parameter used for modifying the corresponding information in the Z-direction set by the parameters exemplified in FIG. 11A. FIG. 11B is a view of the stereoscopic display monitor exemplified in FIG. 3 viewed in the vertical direction. As illustrated in FIG. 11B, the "gap" represents a distance between a liquid crystal display (LCD) pixel surface and a focus of a lenticular lens (the vertical lenticular sheet 201). The "sub-pixel pitch" represents a distance between LCD pixels (pixels 202) arranged in the stereoscopic display monitor. A "lens pitch" denotes the length of a parallax number of LCD pixels (pixels 202) in the lateral direction, and is represented by "Sub-Pixel Pitch×Parallax Number".

The unit of the "protruding limit frequency" in Equation (1) and Equation (2) is "circles per radian (CPR)", and the "protruding limit frequency" is represented by "maximum displayable frequency×N (0<N≤1)". The "maximum displayable frequency" is represented by "Visual Distance/(2× Lens pitch)", and denotes the resolution on the display surface of the stereoscopic display monitor. More specifically, the "CPR" represents the density of rays acceptable by a ray cone spreading from the eyes of the observer among the rays emitted from the stereoscopic display monitor. In the same visual distance, the "CPR" increases as the density of arrangement of the lenticular lenses increases, and decreases as the density of arrangement of the lenticular lenses decreases. In other words, in the same density of arrangement of the lenticular lenses, the "CPR" increases as the visual distance increases, and decreases as the visual distance decreases. The "maximum displayable frequency" is the resolution at which the "CPR" is the maximum. In other words, the "maximum displayable frequency" represents the resolution on the display surface of the stereoscopic display monitor.

In Equation (1) and Equation (2), an assumption is made that the visual distance is "1000 mm", the gap is "0.5 mm", the sub-pixel pitch is "0.05 mm", and the protruding limit frequency is "300 CPR", for example. In this case, the acquisition unit 145a derives "the protruding limit amount of the display unit 142: −16.4 mm" by Equation (1), and derives "the depth limit amount of the display unit 142: 16.9 mm" by Equation (2). The calculation results are rounded off to one decimal place.

An assumption is made that the determination unit 145b sets the corresponding information indicating that "1 mm on the display surface corresponds to 5 mm in the real space" in the protruding direction and the depth direction by using "a(θ,S)" and "b(θ,S)". Furthermore, an assumption is made that the determination unit 145b sets the length of the volume data in the z-direction in the real space coordinates to "100 mm" forward or rearward the center of gravity, for example.

If the length in the z-direction in the real space is "100×2=200 mm", the corresponding information in the protruding direction and the depth direction in the Z-direction indicates that "100 mm in the real space" corresponds to "20 mm on the display surface". However, "20 mm on the display surface" is a value exceeding the protruding limit amount and the depth limit amount.

Therefore, the determination unit 145b modifies the corresponding information in the protruding direction from that "20 mm on the display surface corresponds to 100 mm in the real space" to that "16.4 mm on the display surface corresponds to 100 mm in the real space". Furthermore, the determination unit 145b modifies the corresponding information in the depth direction from that "20 mm on the display surface corresponds to 100 mm in the real space" to that "16.9 mm on the display surface corresponds to 100 mm in the real space". In other words, the determination unit 145b modifies the corresponding information in the protruding direction and the depth direction set by using "a(θ,S)" and "b(θ,S)" based on upper limit condensation of the stereoscopic image in the Z-direction calculated from the protruding limit amount and the depth limit amount.

As a result, the determination unit 145b determines the scale in the protruding direction to be "10 mm on the display surface: 61 mm in the real space". Furthermore, the determination unit 145b determines the scale in the depth direction to be "10 mm on the display surface: 59 mm in the real space". Alternatively, the determination unit 145b determines the scale in the Z-direction to be "10 mm on the display surface: 60 mm in the real space" by using the average value.

The output unit 145c performs control such that the nine-parallax image group and the scale are output on the display unit 142. Specifically, the output unit 145c controls the two-dimensional image processing unit 146 so as to generate an overlay of the scale and to generate two-dimensional images to be output that are obtained by superimposing the overlay thus generated on underlays (nine parallax images).

Figure 12:
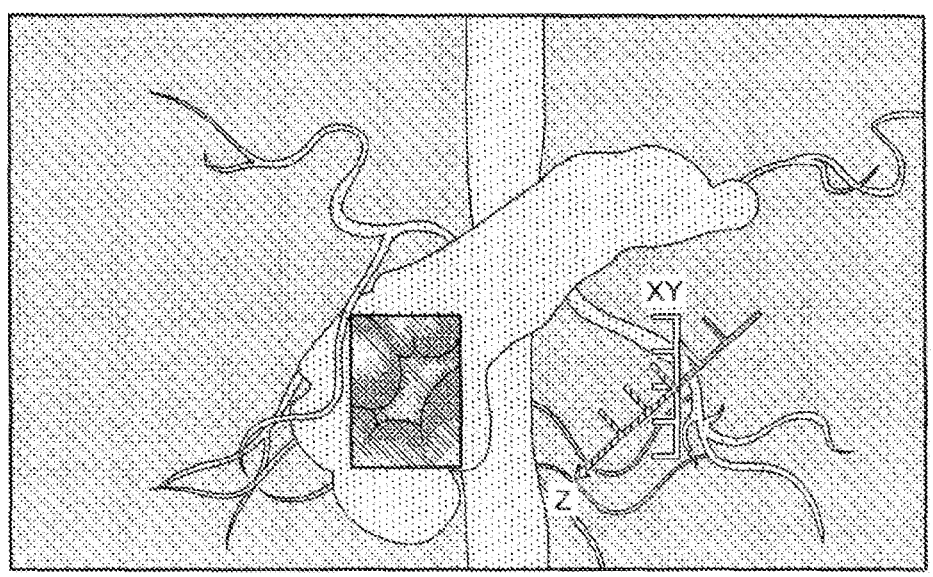
FIG. 12 is a schematic for explaining an example of scale display in the Z-direction.

The output unit 145c converts the nine two-dimensional images to be output that are generated by the two-dimensional image processing unit 146 into an intermediate image as nine-parallax images, and outputs the intermediate image to the display unit 142. As a result, the stereoscopic image is displayed on the display unit 142 with the scales in the X-Y-Z directions superimposed thereon. FIG. 12 is a schematic for explaining an example of scale display in the Z-direction.

In the example illustrated in FIG. 12, the scale in the Z-direction in which the reduction scales in the protruding direction and the depth direction with respect to the display surface are equal to each other is displayed in a manner obliquely superimposed on the scale in the X-Y direction so as to give a stereoscopic effect. By referring to the scale in the Z-direction, the operator (observer) of the terminal device 140 can grasp the size of a region protruding from the display surface in the stereoscopic image space (refer to the inside of a black frame in FIG. 12) in the protruding direction, for example. In the example illustrated in FIG. 12, the scale in the Z-direction in which the protruding direction is the positive direction is displayed.

The scale can be moved in response to a request from the observer. Assumption is made that the observer uses the mouse of the input unit 141, and moves the mouse with the button clicked at the position of the scale, for example. In this case, the control unit 145 issues an instruction to regenerate an overlay in which the position of the scale is moved to the two-dimensional image processing unit 146. As a result, the display unit 142 can display the stereoscopic image in which the position of the scale is moved in response to a mouse operation performed by the observer. By operating the mouse, for example, the observer can move the scale to a region of interest (ROI), such as a tumor site, in the stereoscopic image. Thus, the observer can measure the three-dimensional size of the ROI in the real space.

Figure 13:
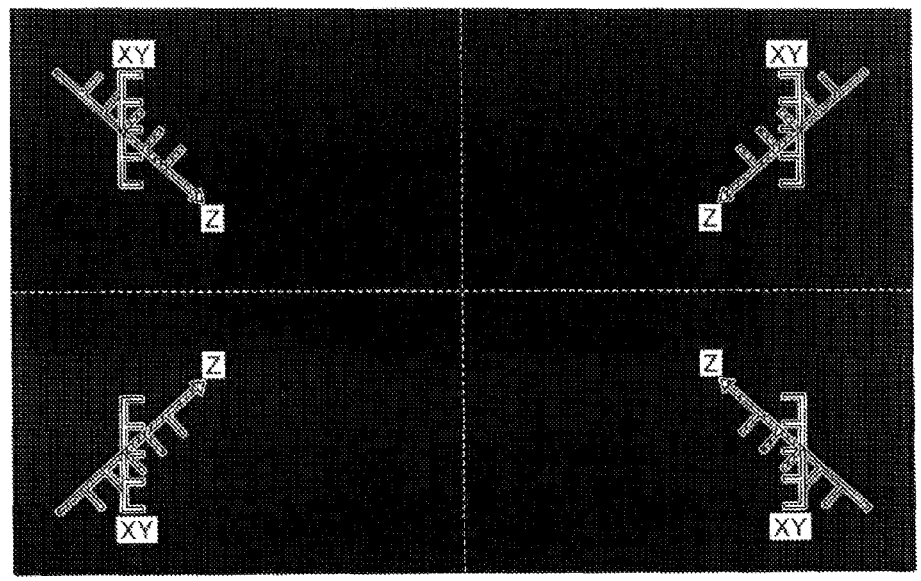
FIG. 13 is a schematic for explaining an example of scale display control in the Z-direction in association with movement.

Furthermore, the output unit 145c performs control such that the direction of a line segment constituting the gauge is changed depending on the position at which the gauge is displayed in a manner superimposed on the stereoscopic image. FIG. 13 is a schematic for explaining an example of scale display control in the Z-direction in association with movement.

As illustrated in FIG. 13, if the position of the scale is moved to the lower right portion of the display surface, for example, the output unit 145c causes the two-dimensional image processing unit 146 to generate an overlay in which the scale in the Z-direction is a line segment extending from lower right to upper left. Furthermore, if the position of the scale is moved to the upper right portion of the display surface as illustrated in FIG. 13, the output unit 145c causes the two-dimensional image processing unit 146 to generate an overlay in which the scale in the Z-direction is a line segment extending from upper right to lower left.

As illustrated in FIG. 13, if the position of the scale is moved to the lower left portion of the display surface, the output unit 145c causes the two-dimensional image processing unit 146 to generate an overlay in which the scale in the Z-direction is a line segment extending from lower left to upper right. Furthermore, if the position of the scale is moved to the upper left portion of the display surface as illustrated in FIG. 13, the output unit 145c causes the two-dimensional image processing unit 146 to generate an overlay in which the scale in the Z-direction is a line segment extending from upper left to lower right.

This control enables the observer to refer to the scale that causes no feeling of strangeness about the stereoscopic effect sensed by the observer, in particular, about the sense of protrusion. If the observer moves the scale to the position of a ROI whose size is desired to be measured by the observer, for example, the direction of the scale in the Z-direction is automatically changed in a direction that causes no feeling of strangeness about the sense of protrusion sensed by the observer depending on the position of the ROI on the display surface by the control described above.

The explanation has been made of an example of the method for determining the scale (hereinafter, a first method). However, the determination processing of the scale may be performed by a second method, which will be described below.

Figure 14:
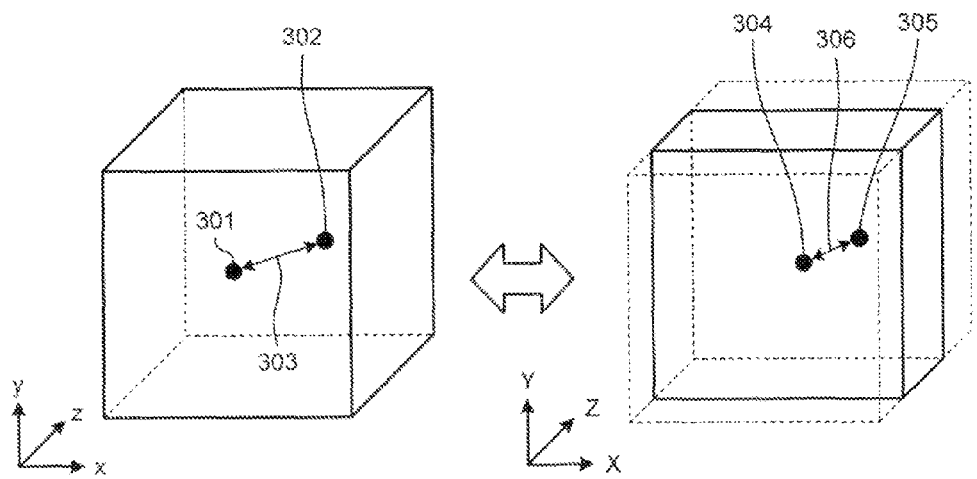
FIG. 14, FIG. 15, and FIG. 16 are schematics for explaining a second method for determining a scale.
Figure 15:
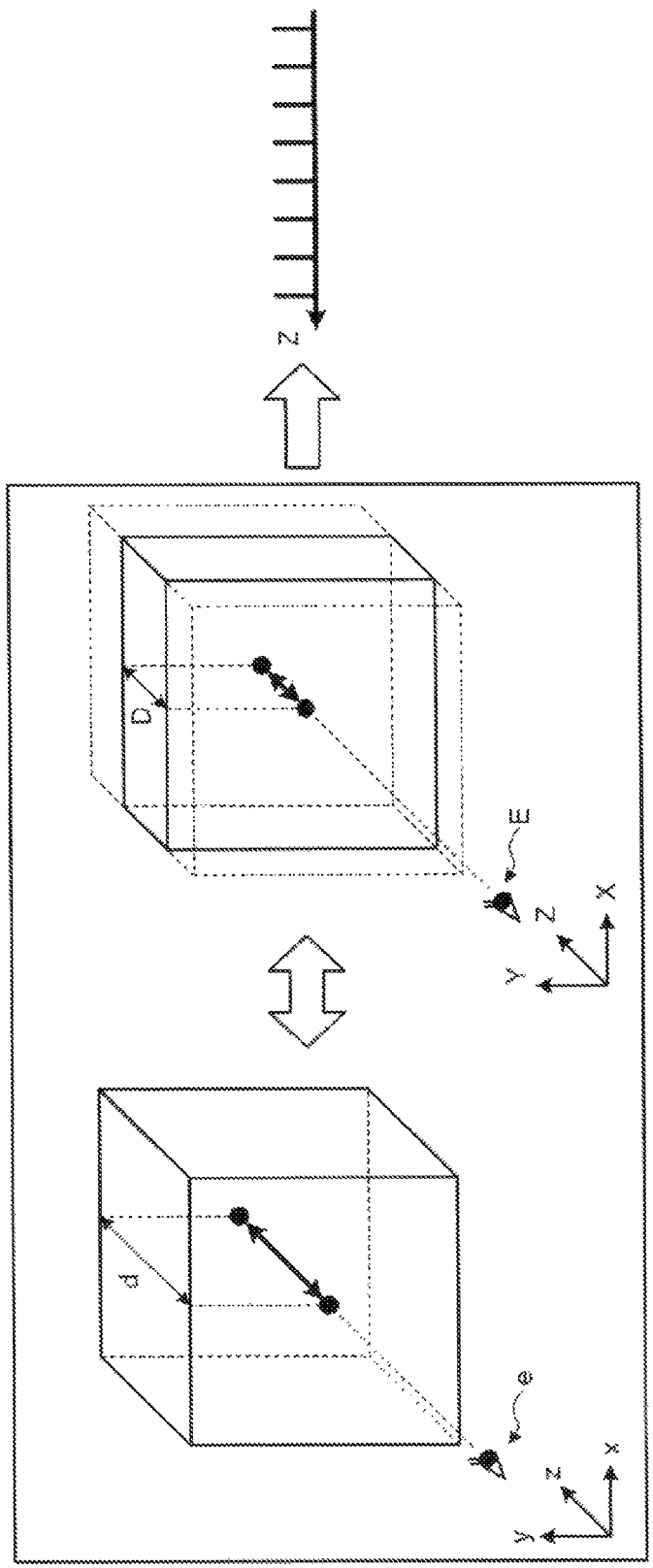
Figure 16:
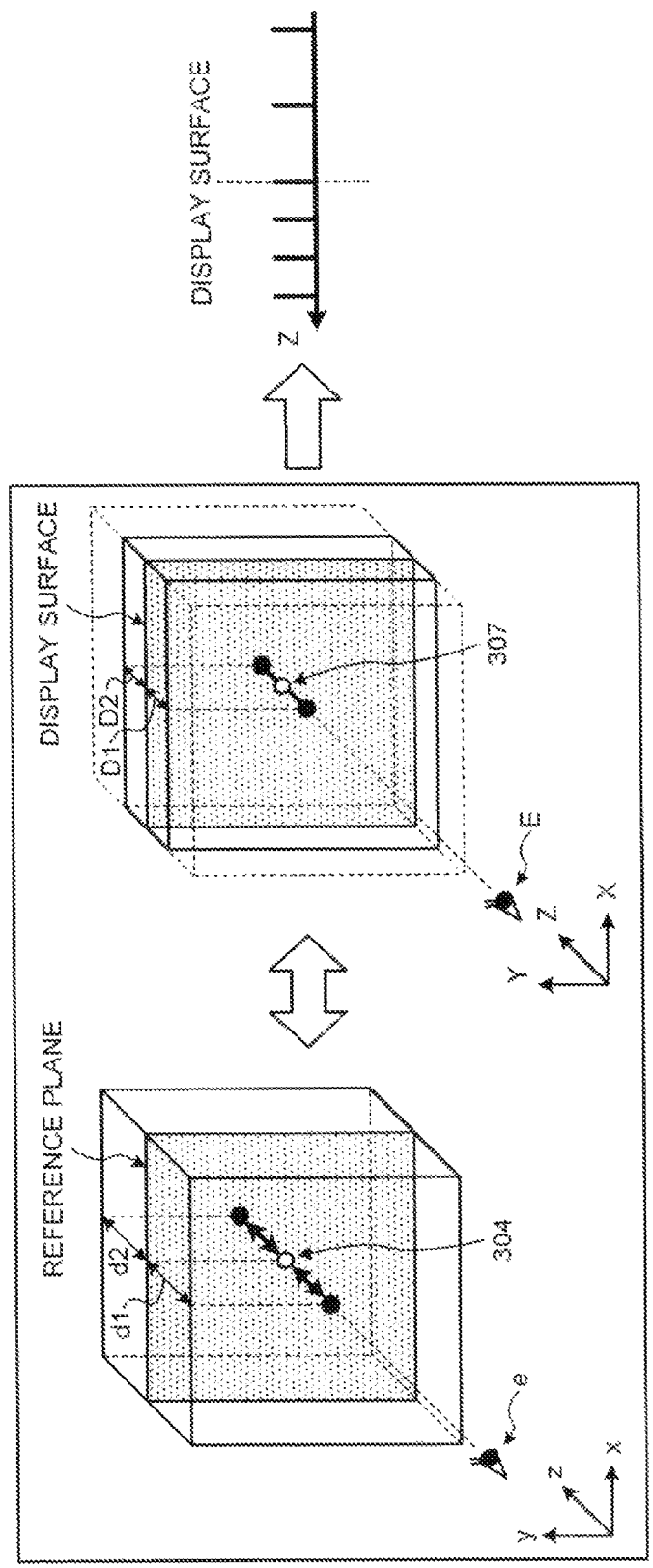

Specifically, in the second method, the determination unit 145b sets corresponding information based on a function that converts stereoscopic image space coordinates into volume data space coordinates and that uses a parallactic angle, a display size, and a direction of a line of sight as parameters. In the second method, the determination unit 145b determines a scale for converting the length in the X-Y direction on the display surface of the stereoscopic display monitor in the stereoscopic image space into the length in the space of the captured site as a gauge based on the corresponding information in addition to the scale in the Z-direction. FIG. 14 to FIG. 16 are schematics for explaining the second method for determining the scale.

The left figure and the right figure of FIG. 14 illustrate the same subject. The left figure of FIG. 14 illustrates an example of volume data in the captured site of the subject indicated by volume data coordinates. The right figure of FIG. 14 illustrates an example of a stereoscopic image displayed on the terminal device 140. Furthermore, "the x-direction, the y-direction, and the z-direction" illustrated in the left figure of FIG. 14 and "the X-direction, the Y-direction, and the Z-direction" illustrated in the right figure of FIG. 14 are the same directions as those described above. A coordinate 301, a coordinate 302, and a distance 303 in the left figure of FIG. 14 correspond to a coordinate 304, a coordinate 305, and a distance 306 in the right figure of FIG. 14, respectively.

The stereoscopic image of the right figure of FIG. 14 is smaller in the protruding direction and the depth direction than the volume data illustrated in the left figure of FIG. 14. In other words, in the stereoscopic image of the right figure of FIG. 14, components of the subject in the protruding direction and the depth direction illustrated in the left figure of FIG. 14 are displayed in a compressed manner. In this case, as illustrated in the right figure of FIG. 14, the distance 306 between the coordinate 304 and the coordinate 305 is made shorter than the distance 303 between the coordinate 301 and the coordinate 302 in the left figure of FIG. 14 by the compression. In other words, the distance 306 displayed in the stereoscopic image is shorter than the distance 303 in the real space. In the example illustrated in FIG. 14, the explanation has been made of the case where the stereoscopic image is made smaller in the z-direction alone. However, the stereoscopic image may be made smaller in both the x-direction and the z-direction, or the stereoscopic image may be made smaller in both the y-direction and the z-direction, or the stereoscopic image may be made smaller in all the x-y-z directions, for example. In other words, a line in the volume data space may be a line of a different length or a curve of a different length in the stereoscopic image space.

The correspondence relationship between the stereoscopic image space coordinates and the volume data space coordinates is determined uniquely by the scale for the stereoscopic image, the parallactic angle, and the direction of the line of sight (the direction of the line of sight in the rendering or the direction of the line of sight in the observation of the stereoscopic image), and other elements, and can be represented by Equation (3):

$$(x1, y1, z1) = F(x2, y2, z2) \qquad (3)$$

where "x2", "y2", and "z2" each represents a stereoscopic image space coordinate, "x1", "y1", and "z1" each represents a volume data space coordinate, and "F" represents a function determined uniquely by the scale for the stereoscopic image, the parallactic angle, the direction of the line of sight, and other elements. In other words, the determination unit 145b uses Equation (3), thereby setting the correspondence relationship between the stereoscopic image space coordinates and the volume data space coordinates. The function "F" is generated by the determination unit 145b every time the scale for the stereoscopic image, the parallactic angle, the direction of the line of sight (the direction of the line of sight in the rendering or the direction of the line of sight in the observation of the stereoscopic image), and other elements are changed. As the function "F" that converts rotation, parallel movement, enlargement, and reduction, for example, an affine conversion represented by Equation (4) is used:

$$x1 = a*x2 + b*y2 + c*z3 + d$$

$$y1 = e*x2 + f*y2 + g*z3 + h$$

$$z1 = i*x2 + j*y2 + k*z3 + l \qquad (4)$$

where a to l represent conversion factors.

The correspondence relationship between the volume data space coordinates and the real space coordinates can be set based on generation conditions of the volume data. The determination unit 145b acquires the generation conditions from the additional information of the volume data stored in the image storage device 120, for example. The determination unit 145b then sets the corresponding information between the stereoscopic image space coordinates and the real space coordinates based on the correspondence relationship between the stereoscopic image space coordinates and the volume data space coordinates obtained by the function "F" and on the correspondence relationship between the volume data space coordinates and the real space coordinates acquired from the additional information.

By using the function "F", for example, the determination unit 145b sets a distance D between two points in a direction of a line of sight from an observer viewpoint E and a distance in the real space corresponding to a distance d between two points in a direction of a line of sight from a viewpoint e in the rendering processing as the corresponding information as illustrated in FIG. 15. Subsequently, as illustrated in FIG. 15, the determination unit 145b determines the scale in the Z-direction based on the ratio between the "distance D" and the "distance in the real space corresponding to the distance d", for example. In the example illustrated in FIG. 15, the determination unit 145b determines the scale in the Z-direction in which the protruding direction is the positive direction.

Also in the second method, the determination unit 145b may determine a scale in which reduction scales in the protruding direction and the depth direction with respect to the display surface are different from each other similarly to the first embodiment.

As illustrated in FIG. 16, for example, the determination unit 145b acquires positional information of a section that is orthogonal to the direction of the line of sight from the viewpoint e in the rendering processing and that corresponds to a reference plane (a projection plane) in the volume rendering in the volume data space coordinates. Furthermore, the determination unit 145b acquires positional information of an intersection 304 (center of gravity) of the reference plane and the direction of the line of sight from the viewpoint e. The determination unit 145b then acquires "a distance d1 and a distance d2", each of which is a distance between each of the two points in the direction of the line of sight from the viewpoint e in the rendering processing and the intersection 304.

Furthermore, as illustrated in FIG. 16, the determination unit 145b acquires positional information of a section corresponding to the reference plane described above in the direction of the line of sight from the observer viewpoint E in the stereoscopic image space coordinates, that is, positional information of the display surface. The determination unit 145b further acquires positional information of an intersection 307 of the display surface and the direction of the line of sight. The determination unit 145b then acquires "a distance D1 and a distance D2", each of which is a distance between each of the two points in the direction of the line of sight from the observer viewpoint E and the intersection 307.

The determination unit 145b then sets "the distance D1 and the distance in the real space corresponding to the distance d1" as the corresponding information in the protruding direction. Furthermore, the determination unit 145b sets "the distance D2 and the distance in the real space corresponding to the distance d2" as the corresponding information in the depth direction. The determination unit 145b then determines the scale in the protruding direction in the Z-direction based on the ratio between the "distance D1" and the "distance in the real space corresponding to the distance d1". Furthermore, the determination unit 145b determines the scale in the depth direction in the Z-direction based on the ratio between the "distance D2" and the "distance in the real space corresponding to the distance d2". In other words, as exemplified in FIG. 16, the determination unit 145b determines the scale in the Z-direction in which gauges in the protruding direction and the depth direction are different from each other with respect to the display surface. In the example illustrated in FIG. 16, the determination unit 145b determines the scale in the Z-direction in which the protruding direction is the positive direction.

Furthermore, the determination unit 145b can set the corresponding information between the reference plane and the display surface as described above. Specifically, the reference plane and the display surface are not necessarily in a proportional relation depending on the function "F" as described above. Furthermore, even in the same direction of the line of sight, if the position of the reference plane moves in the volume data space coordinates, the position of the display surface also moves in the stereoscopic image space coordinates. If the reference plane moves in the same direction of the line of sight, the scale on the display surface, that is, the scale in the X-Y direction changes even in the same direction of the line of sight during the observation. To address this, the determination unit 145b determines the scale in the X-Y direction based on the corresponding information between the reference plane and the display surface thus set.

Furthermore, the surface corresponding to the reference plane in the stereoscopic image space is not necessarily a plane surface depending on the function "F". In this case, the surface corresponding of the reference plane and the display surface are different from each other, and the scales in the X-Y direction thereof are different from each other depending on the display position of the scales. To address this, the determination unit 145b changes the scale in the X-Y direction depending on the display position thereof based on the corresponding information between the reference plane and the display surface thus set and performs control such that the scale in the X-Y direction thus changed is displayed.

The explanation has been made of the case where the determination unit 145b sets the corresponding information based on the function "F". Alternatively, in the present embodiment, the storage unit 144 may include a coordinate table in which the stereoscopic image space coordinates correspond to the volume data space coordinates, for example, and the determination unit 145b may use the coordinate table to acquire the correspondence relationship between the stereoscopic image space coordinates and the volume data space coordinates, thereby setting the corresponding information between the stereoscopic image space coordinates and the real space coordinates. In the second method, if the observer moves the scale to the position of the ROI, for example, the scale in the X-direction, the scale in the Y-direction, and the scale in the Z-direction are changed depending on the position of the scale after the movement. By referring to the scale output by the second method, the observer can measure the three-dimensional size of the ROI in the real space accurately.

Figure 17:
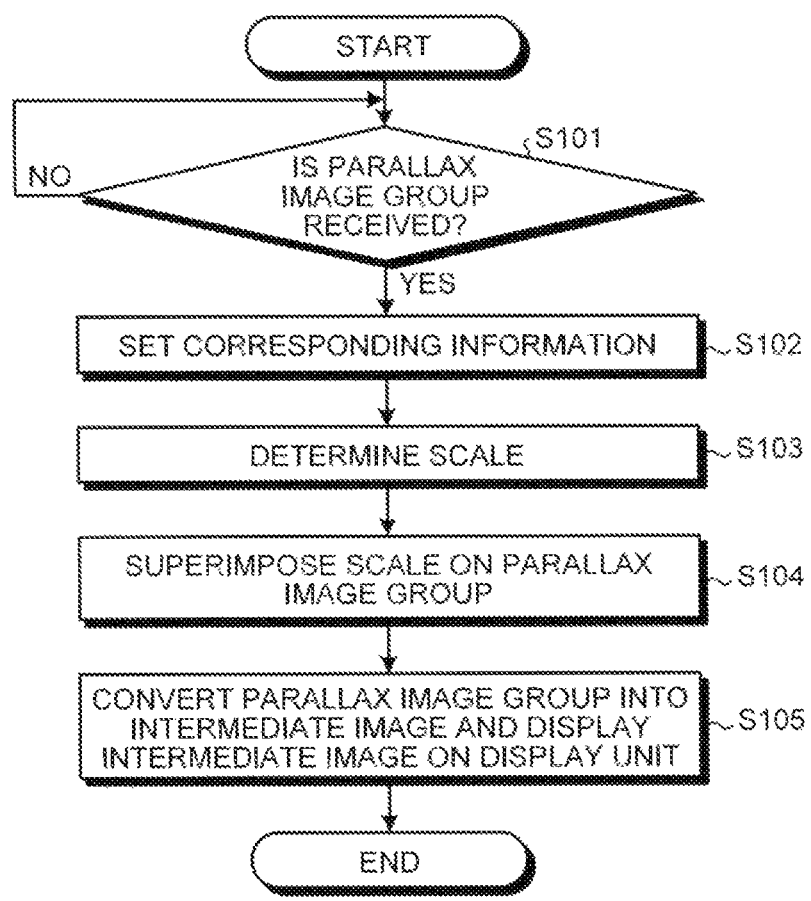
FIG. 17 is a flowchart for explaining scale display processing performed by the terminal device according to the first embodiment.

The processing of the image processing system 1 according to the first embodiment will now be described with reference to FIG. 17. FIG. 17 is a flowchart for explaining scale display processing performed by the terminal device according to the first embodiment. FIG. 17 is a flowchart illustrating the processing performed after the workstation 130 generates a parallax image group of volume data specified by the operator of the terminal device 140.

As illustrated in FIG. 17, the terminal device 140 of the image processing system 1 according to the first embodiment determines whether the parallax image group is received (Step S101). If no parallax image group is received (No at Step S101), the terminal device 140 waits until the parallax image group is received.

By contrast, if the parallax image group is received (Yes at Step S101), the acquisition unit 145a acquires rendering conditions, and the determination unit 145b uses a parallactic angle included in the rendering conditions and a display size to set corresponding information for causing the coordinates in the stereoscopic image space to correspond to the coordinates in the real space (Step S102). The determination unit 145b, for example, sets the corresponding information by the first method using parameters in which the parallactic angle and the display size are variables or by the second method using a function that converts the stereoscopic image space coordinates into the volume data space coordinates and that uses the parallactic angle, the display size, and a direction of a line of sight in the observation of the stereoscopic image as parameters.

The determination unit 145b then determines a scale based on the corresponding information (Step S103), and the output unit 145c causes the two-dimensional image processing unit 146 to superimpose the scale on each image of the parallax image group (Step S104).

The output unit 145c then converts the parallax image group on which the scale is superimposed by the two-dimensional image processing unit 146 into an intermediate image, and displays the intermediate image on the display unit 142 (Step S105), and the processing is terminated. If the display position of the scale is changed, the output unit 145c determines a scale whose gauge is changed depending on the display position, and causes the two-dimensional image processing unit 146 to superimpose the scale thus determined on each image of the parallax image group.

As described above, in the first embodiment, using the first method or the second method makes it possible to display the scale in the Z-direction in accordance with the rendering conditions used for generating the parallax image group for display of the stereoscopic image. Therefore, in the first embodiment, it is possible to display the gauge for causing the image viewed stereoscopically by the observer on the monitor enabling stereoscopic vision to correspond to the real space. Furthermore, in the first embodiment, using the second method makes it possible to determine the scale in the X-direction and the Y-direction in the stereoscopic image space in accordance with the rendering conditions in addition to the scale in the Z-direction. In other words, by setting the corresponding information using the function "F", the determination unit 145b can determine the scale following movement of the viewpoint and the direction of the line of sight, enlargement and reduction of the volume data, and other factors.

In the first embodiment, using the corresponding information set by the first method or the second method makes it possible to display the scale in which reduction scales in the protruding direction and the depth direction are different from each other. Furthermore, in the first embodiment, the shape of the scale (direction of the line segment) and the gauge of the scale can be changed depending on the display position of the scale. In particular, by changing the gauge of the scale depending on the display position of the scale, the observer can roughly grasp the size of the ROI focused on by the observer.

Second Embodiment

The present embodiment may be realized by other embodiments in addition to the first embodiment. Other embodiments will be described below. FIGS. 18A to 18E, FIG. 19, FIGS. 20A to 20C, and FIG. 21 are schematics for explaining a second embodiment.

Stereoscopic Display Monitor

In the first embodiment, the explanation has been made of the case where the stereoscopic display monitor is a nine-parallax monitor. However, the scale output processing explained in the first embodiment may be applied to the case where the stereoscopic display monitor is a two-parallax monitor. In other words, in the first embodiment, setting of the corresponding information and determination of the scale may be performed by using "a(θ,S)", "b(θ,S)", and a function "F" in accordance with the specifications of the two-parallax monitor.

Scale

Figure 18A:
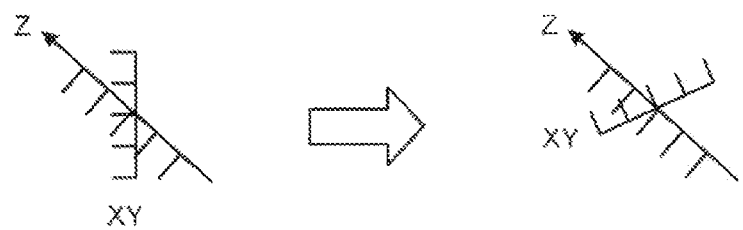
FIG. 18A, FIG. 18B, FIG. 18C, FIG. 18D, FIG. 18E, FIG. 19, FIG. 20A, FIG. 20B, FIG. 20C, and FIG. 21 are schematics for explaining a second embodiment.

In the first embodiment, the explanation has been made of the case where the scale in the X-Y direction, which is a scale in the X-direction and the Y-direction, is fixed in the longitudinal direction of the display surface. Alternatively, the scale in the X-Y direction may be moved to rotate in response to a mouse operation performed by the operator (observer) as illustrated in FIG. 18A, for example.

Figure 18B:
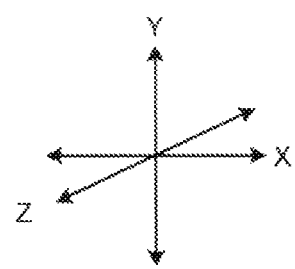

In the first embodiment, the explanation has been made of the case where the scale in the X-direction and the scale in the Y-direction are integrated in the X-Y direction. Alternatively, the scale in the X-Y direction may be divided into the scale in the X-direction and the scale in the Y-direction as illustrated in FIG. 18B, for example.

Figure 18C:
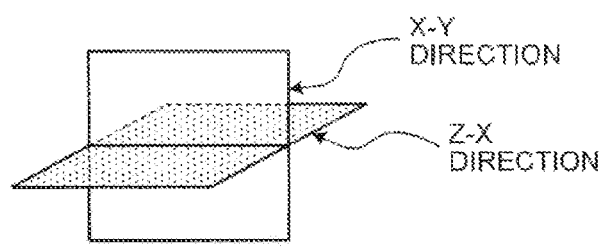
Figure 18D:
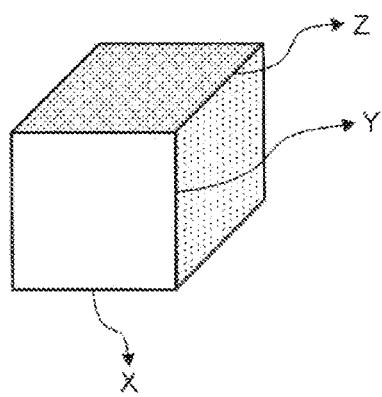
Figure 18E:
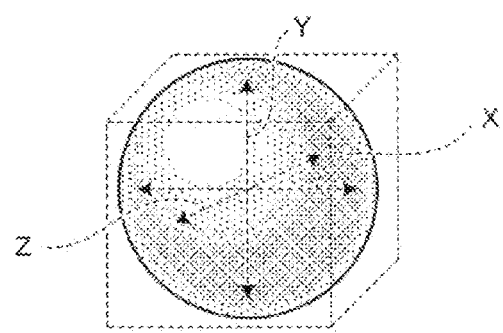

Furthermore, the scale is not necessarily formed of a line segment as explained in the first embodiment. The scale may be formed of a plane surface indicating a scale in the X-Y direction and a plane surface indicating a scale in the Z-X direction as illustrated in FIG. 18C, for example. Alternatively, the scale may be formed of a rectangular parallelepiped indicating the scales in the X-Y-Z directions collectively as illustrated in FIG. 18D, for example. Still alternatively, the scale may be formed of a sphere indicating the scales in the X-Y-Z directions collectively as illustrated in FIG. 18E, for example. If the scales illustrated in FIGS. 18C to 18E are displayed, processing for setting the opacity of the scales to "50%" is preferably performed to prevent the visibility of the stereoscopic image from being reduced, for example.

Figure 19:
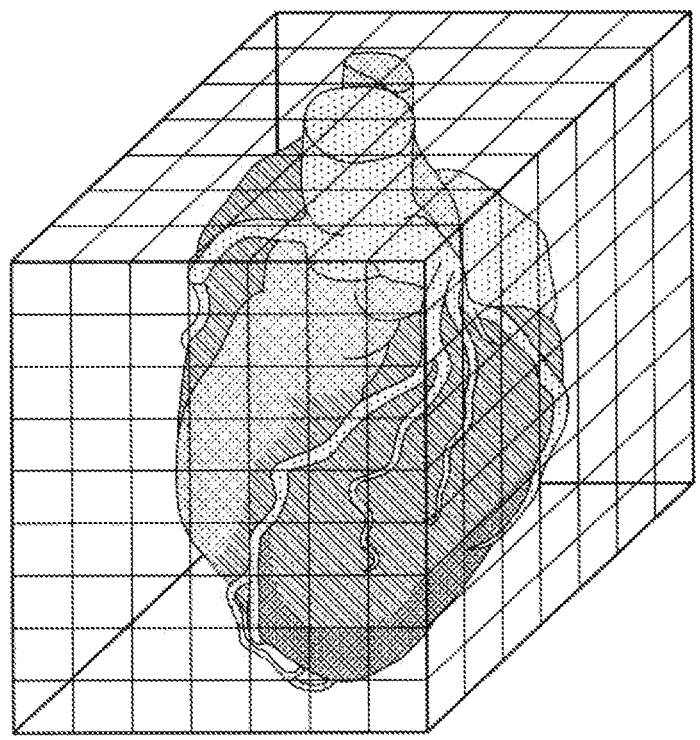

The determination unit 145b may determine grid lines that divide the stereoscopic image space in a grid as a gauge in accordance with the corresponding information. In other words, the scale may be a scale using the grid lines as illustrated in the example of FIG. 19. In the example of FIG. 19, the grid lines are equally spaced in the X-direction, the Y-direction, and the Z-direction. Actually, however, the grid lines are unevenly spaced in the X-direction, the Y-direction, and the Z-direction because of "a(θ,S)", "b(θ,S)", and the function "F". Furthermore, the grid lines in the X-direction, the Y-direction, and the Z-direction may be straight lines or curves because of "a(θ,S)", "b(θ,S)", and the function "F".

By displaying the scales in the X-direction, the Y-direction, and the Z-direction as the grid lines in the entire stereoscopic image space in this manner, the observer can grasp the size of the stereoscopic image in the real space as a whole. Furthermore, by setting the corresponding information using the function "F", the determination unit 145b can determine the grid lines following movement of the viewpoint and the direction of the line of sight, enlargement and reduction of the volume data, and other factors. Moreover, by displaying the scales as the grid lines on the entire stereoscopic image space, the observer can view the stereoscopic image more stereoscopically.

The determination unit 145b may convert information of the axis used for the gauge in accordance with the corresponding information from the coordinate axis of the stereoscopic image space into the coordinate axis of the volume data space. In other words, the determination unit 145b may perform conversion processing from the scale of the stereoscopic image space to the scale of the volume data space. In this case, the acquisition unit 145a acquires information related to the coordinate axis of the volume data space from the additional information associated with the volume data in the image storage device 120, for example.

Figure 20A:
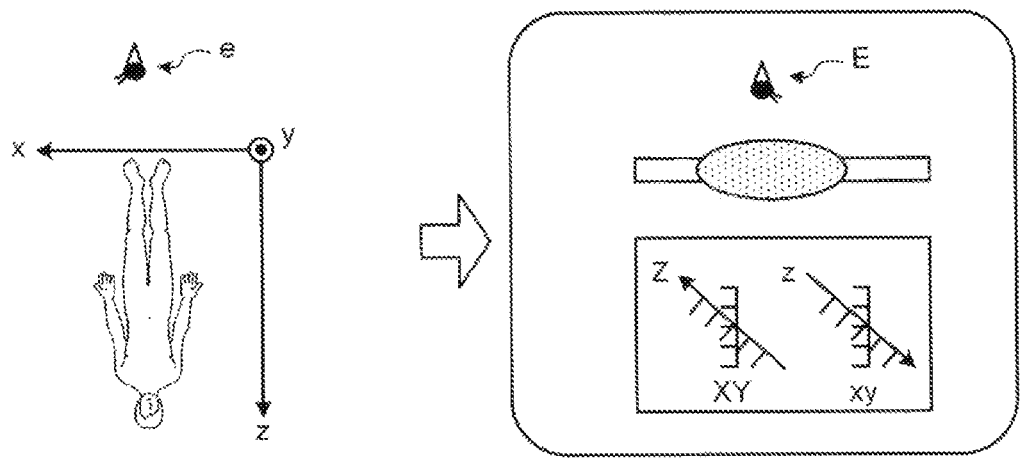
Figure 20B:
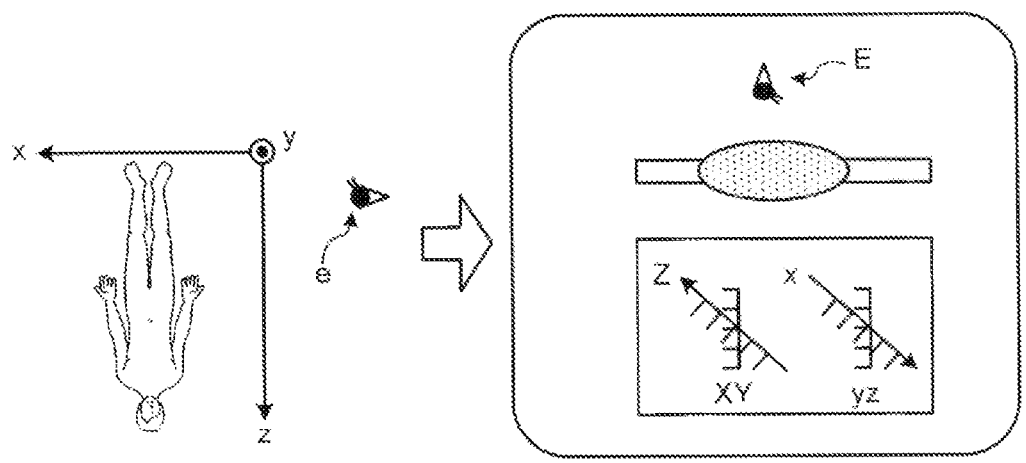

As illustrated in FIG. 20A and FIG. 20B, for example, the acquisition unit 145a acquires information indicating that a direction from the feet to the head is the positive direction in the z-direction, that a direction from the right arm to the left arm is the positive direction in the x-direction, and that a direction from the back to the belly is the positive direction in the y-direction in the volume data space corresponding to the real space based on the posture of the subject during capturing. When acquiring the corresponding information using the function "F", for example, the acquisition unit 145a also acquires the information of the direction of the line of sight from the viewpoint e in the rendering processing (refer to FIG. 16).

An assumption is made that the direction of the line of sight from the viewpoint e in the rendering processing acquired by the acquisition unit 145a is a direction from negative to positive along the z-direction as illustrated in FIG. 20A. In this case, the determination unit 145b determines the scale in the X-Y direction and the scale in the Z-direction in the stereoscopic image space as described above (refer to FIG. 20A). Furthermore, because the scale in the X-Y direction corresponds to the scale in the x-y direction, and the scale in the Z-direction corresponds to the scale in the z-direction, the determination unit 145b determines the scale in the x-y direction and the scale in the z-direction as the scales to be output as illustrated in FIG. 20A. At this time, because the depth direction of the stereoscopic image viewed from the observer viewpoint E corresponds to the positive direction of the z-direction, the determination unit 145b performs setting such that the direction of the arrow in the z-direction is opposite to the direction of the arrow in the Z-direction as illustrated in FIG. 20A.

Furthermore, an assumption is made that the direction of the line of sight from the viewpoint e in the rendering processing acquired by the acquisition unit 145a is a direction from negative to positive along the x-direction as illustrated in FIG. 20B. In this case, the determination unit 145b determines the scale in the X-Y direction and the scale in the Z-direction in the stereoscopic image space as described above (refer to FIG. 20B). Furthermore, because the scale in the X-Y direction corresponds to the scale in the y-z direction, and the scale in the Z-direction corresponds to the scale in the x-direction, the determination unit 145b determines the scale in the y-z direction and the scale in the x-direction as the scales to be output as illustrated in FIG. 20B. At this time, because the depth direction of the stereoscopic image viewed from the observer viewpoint e corresponds to the positive direction of the x-direction, the determination unit 145b performs setting such that the direction of the arrow in the x-direction is opposite to the direction of the arrow in the Z-direction as illustrated in FIG. 20B.

Figure 20C:
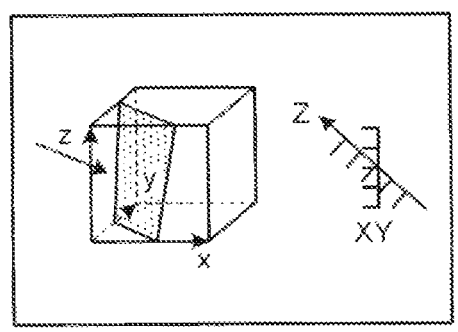

If the direction of the line of sight from the viewpoint e in the rendering processing is not a direction directly opposite to the x-y plane, the y-z plane, or the z-x plane unlike the examples in FIG. 20A and FIG. 20B, it is inappropriate to use the notation of x, y, and z in the scale of the volume data space (hereinafter, referred to as a V scale). In this case, the determination unit 145b may cause the two-dimensional image processing unit 146 to generate an image by superimposing the direction of the line of sight in the rendering and the reference plane in the capturing on a figure in a cube shape schematically illustrating the volume data, and determine the image, the scale in the X-Y direction, and the scale in the Z-direction to be the V scale as illustrated in FIG. 20C.

This processing facilitates the observer to identify the direction in which the volume data is observed in the volume data space to obtain the stereoscopic image observed by the observer on the stereoscopic display monitor. The explanation has been made of the case where the scale of the volume data space is determined to be the scale to be output in addition to the scale of the stereoscopic image space. Alternatively, the scale to be output may be the scale of the volume data space alone.

The conversion processing from the scale of the stereoscopic image space to the scale of the volume data space may be applied to the case where the grid lines are used as the scale as explained with reference to FIG. 19. In this case, the grid lines are formed of straight lines or curves along the x-direction, the y-direction, and the z-direction. The scale in the volume data space using the grid lines facilitates the observer to identify the direction in which the volume data is observed in the volume data space to obtain the stereoscopic image observed on the stereoscopic display monitor without performing the processing illustrated in FIG. 20C.

Scale Display

In the first embodiment, the explanation has been made of the case where the output unit 145c performs control such that the scale determined by the determination unit 145b is displayed. Alternatively, the scale may be hidden depending on a request from the observer. In other words, the output unit 145c may control whether to output the scale determined by the determination unit 145b depending on a request from the observer of the stereoscopic display monitor.

Specifically, when observing the stereoscopic image, the observer may determine that the scale being displayed is unnecessary. In this case, for example, the operator who is the observer of the terminal device 140 inputs a non-display request of the scale via the input unit 141. As a result, to hide the scale being displayed, the output unit 145c converts the nine-parallax images on which the overlay of the scale is yet to be superimposed into an intermediate image, and outputs the intermediate image to the display unit 142.

System Configuration

Figure 21:
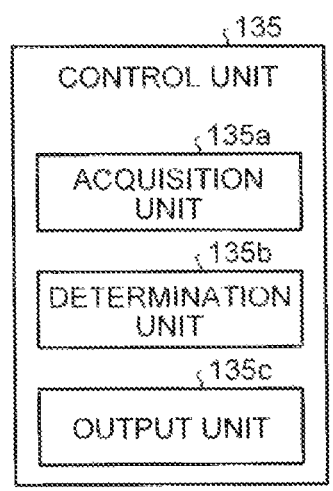

In the first embodiment, the explanation has been made of the case where acquisition of the rendering conditions, setting of the corresponding information, determination of the scale, and output of the scale are performed in the terminal device 140. Alternatively, in the first embodiment, acquisition of the rendering conditions, setting of the corresponding information, determination of the scale, and output of the scale may be performed in the workstation 130. In this case, as illustrated in FIG. 21, the control unit 135 includes an acquisition unit 135a corresponding to the acquisition unit 145a, a determination unit 135b corresponding to the determination unit 145b, and an output unit 135c corresponding to the output unit 145c. The acquisition unit 135a acquires rendering conditions. The determination unit 135b sets corresponding information based on the rendering conditions acquired by the acquisition unit 135a, and determines the scales in the X-direction, the Y-direction, and the Z-direction based on the corresponding information.

The output unit 135c performs control such that the nine-parallax images and the scales are output on the display unit 142. Specifically, the output unit 135c controls the rendering processing unit 136 so as to generate an overlay of the scales and to generate two-dimensional images to be output that are obtained by superimposing the overlay thus generated on underlays (nine parallax images). The output unit 135c then controls the communication unit 133 so as to transmit the nine two-dimensional images to be output that are generated by the rendering processing unit 136 to the terminal device 140 as nine-parallax images. The communication unit 143 of the terminal device 140 transfers the nine-parallax images thus received to the control unit 145. The control unit 145 then converts the nine-parallax images into an intermediate image, and outputs the intermediate image to the display unit 142. As a result, the display unit 142 displays the stereoscopic image together with the scales in the X-Y-Z directions.

In the embodiment described above, the explanation has been made of the case where the workstation 130 generates the parallax image group. Alternatively, the medical image diagnosis apparatus 110 may generate the parallax image group. In this case, acquisition of the rendering conditions, setting of the corresponding information, determination of the scale, and output of the scale may be performed by the medical image diagnosis apparatus 110. The processing related to "acquisition of the rendering conditions, setting of the corresponding information, determination of the scale, and output of the scale" explained in the embodiment described above may be performed only by the medical image diagnosis apparatus 110, only by the workstation 130, or only by the terminal device 140. For example, the acquisition unit 135a, the determination unit 135b, and the output unit 135c may output the scales in the X-Y-Z directions of the stereoscopic image displayed on the display unit 132. Furthermore, the processing related to "acquisition of the rendering conditions, setting of the corresponding information, determination of the scale, and output of the scale" explained in the embodiment described above may be performed between the medical image diagnosis apparatus 110 and the workstation 130 or between the medical image diagnosis apparatus 110 and the terminal device 140.

In other words, the processing related to "acquisition of the rendering conditions, setting of the corresponding information, determination of the scale, and output of the scale" explained in the embodiment described above may be realized by being dispersed or integrated in arbitrary units functionally or physically depending on various types of loads and usages of each of the devices included in the image processing system 1. Furthermore, the whole or an arbitrary part of each processing function performed by each of the devices is realized by a CPU and a computer program analyzed and executed by the CPU, or realized as hardware by wired-logic.

Others

The image processing method explained in the embodiments described above can be realized by executing an image processing program prepared in advance in a computer, such as a personal computer and a workstation. The image processing program can be distributed via a network, such as the Internet. Furthermore, the image processing program may be recorded in a computer-readable recording medium, such as a hard disk, a flexible disk (FD), a compact disk read-only memory (CD-ROM), a magneto-optical disk (MO), a digital versatile disk (DVD), and a Blu-ray Disc (registered trademark), and may be executed by being read from the recording medium by the computer.

As described above, according to the first embodiment, the second embodiment, and the modifications of the second embodiment, it is possible to display a scale for causing the image viewed stereoscopically by the observer on the monitor enabling stereoscopic vision to correspond to the real space.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image processing system comprising:
an acquisition unit implemented by circuitry and configured to acquire a rendering condition including a parallactic angle between parallax images constituting a parallax image group used for generating the parallax image group that is a predetermined parallax number of parallax images from volume data that is three-dimensional medical image data;
a determination unit implemented by the circuitry and configured to set, based on the parallactic angle included in the rendering condition and a display size of the parallax image group displayed on the stereoscopic display device, corresponding information for causing a space coordinate of a stereoscopic image viewed stereoscopically by referring to a stereoscopic display device that displays the parallax image group to correspond to a space coordinate of a captured site in the volume data, and to determine, based on the corresponding information, a scale for converting a length in a perpendicular direction with respect to a display surface of the stereoscopic display device in a space of the stereoscopic image into a length in a space of the captured site, wherein the perpendicular direction is both a protruding direction with respect to the display surface and a depth direction with respect to the display surface; and
an output unit implemented by the circuitry and configured to perform output control such that the scale is displayed on the stereoscopic display device in a manner superimposed on the stereoscopic image based on the parallax image group.

2. The image processing system according to claim 1, wherein the determination unit is configured to set the corresponding information based on a function that converts the space coordinate of the stereoscopic image into the space coordinate of the volume data and that uses the parallactic angle, the display size, and a direction of a line of sight as parameters, and to determine a scale for converting a length in the space of the stereoscopic image on the display surface of the stereoscopic display device into a length in the space of the captured site as the scale based on the corresponding information in addition to the scale for converting the length in the perpendicular direction with respect to the display surface of the stereoscopic display device in the space of the stereoscopic image into the length in the space of the captured site.

3. The image processing system according to claim 1, wherein the determination unit is configured to determine a scale in which reduction scales in the protruding direction and the depth direction with respect to the display surface are different from each other in accordance with the corresponding information.

4. The image processing system according to claim 1, wherein the output unit is configured to perform control such that a direction of a line segment constituting the scale is changed depending on a position at which the scale is displayed in a manner superimposed on the stereoscopic image.

5. The image processing system according to claim 1, wherein the determination unit is configured to determine a grid line that divides the space of the stereoscopic image in a grid as the scale in accordance with the corresponding information.

6. The image processing system according to claim 1, wherein the output unit is configured to control whether to display the scale determined by the determination unit in a superimposed manner depending on a request from an observer of the stereoscopic display device.

7. The image processing system according to claim 1, wherein the determination unit is configured to convert information of an axis used for the scale in accordance with the corresponding information from a coordinate axis of a stereoscopic image space into a coordinate axis of a volume data space.

8. An image processing apparatus comprising:
an acquisition unit implemented by circuitry and configured to acquire a rendering condition including a parallactic angle between parallax images constituting a parallax image group used for generating the parallax image group that is a predetermined parallax number of parallax images from volume data that is three-dimensional medical image data;
a determination unit implemented by the circuitry and configured to set, based on the parallactic angle included in the rendering condition and a display size of the parallax image group displayed on the stereoscopic display device, corresponding information for causing a space coordinate of a stereoscopic image viewed stereoscopically by referring to a stereoscopic display device that displays the parallax image group to correspond to a space coordinate of a captured site in the volume data, and to determine, based on the corresponding information, a scale for converting a length in a perpendicular direction with respect to a display surface of the stereoscopic display device in a space of the stereoscopic image into a length in a space of the captured site, wherein the perpendicular direction is both a protruding direction with respect to the display surface and a depth direction with respect to the display surface; and
an output unit implemented by the circuitry and configured to perform output control such that the scale is displayed on the stereoscopic display device in a manner superimposed on the stereoscopic image based on the parallax image group.

9. An image processing method comprising:
acquiring, by an acquisition unit implemented by an image processing device including circuitry, a rendering condition including a parallactic angle between parallax images constituting a parallax image group used for generating the parallax image group that is a predetermined parallax number of parallax images from volume data that is three-dimensional medical image data;
setting, by a determination unit implemented by the image processing device including the circuitry, based on the parallactic angle included in the rendering condition and a display size of the parallax image group displayed on the stereoscopic display device, corresponding information for causing a space coordinate of a stereoscopic image viewed stereoscopically by referring to a stereoscopic display device that displays the parallax image group to correspond to a space coordinate of a captured site in the volume data, and determining, based on the corresponding information, a scale for converting a length in a perpendicular direction with respect to a display surface of the stereoscopic display device in a space of the stereoscopic image into a length in a space of the captured site based on the corresponding information, wherein the perpendicular direction is both a protruding direction with respect to the display surface and a depth direction with respect to the display surface; and
performing, by an output unit implemented by the image processing device including the circuitry, output control such that the scale is displayed on the stereoscopic display device in a manner superimposed on the stereoscopic image based on the parallax image group.

10. The image processing system according to claim 1, wherein the determination unit is configured to modify the corresponding information in accordance with both a protruding limit amount and a depth limit amount that is determined based on hardware specifications of the stereoscopic display device.

* * * * *